United States Patent [19]
De Milleville

[11] Patent Number: 5,909,378
[45] Date of Patent: Jun. 1, 1999

[54] CONTROL APPARATUS AND METHOD FOR MAXIMIZING ENERGY SAVING IN OPERATION OF HVAC EQUIPMENT AND THE LIKE

[76] Inventor: Hugues De Milleville, R. R. #1, Loretto, Ontario, Canada, L0G 1L0

[21] Appl. No.: 08/838,657

[22] Filed: Apr. 9, 1997

[51] Int. Cl.[6] .................................................. F24F 11/053
[52] U.S. Cl. .............................. 364/528.11; 364/528.13; 364/528.34; 364/528.35; 702/130; 236/46 R; 236/47; 236/49.3
[58] Field of Search ........................... 364/528.11, 528.13, 364/528.1, 528.26, 528.31, 528.34, 528.35, 528.41, 141, 143; 702/33, 40, 49, 57, 79, 89, 99, 105, 119, 123, 125, 130, 131, 134, 176, 177, 182, 183, 189; 250/214 AL; 236/46 R, 47, 49.3; 165/232, 233, 237, 200, 201, 203, 238, 239, 242; 340/528, 545, 573, 581, 588, 600; 374/102, 103, 108–111

[56] References Cited

U.S. PATENT DOCUMENTS

| | | | |
|---|---|---|---|
| 4,407,447 | 10/1983 | Sayegh ..................................... | 236/49.3 |
| 4,969,508 | 11/1990 | Tate et al. ............................... | 236/49.3 |
| 5,318,224 | 6/1994 | Darby et al. .............................. | 236/47 |
| 5,329,991 | 7/1994 | Mehta et al. ............................. | 236/46 R |
| 5,395,042 | 3/1995 | Riley et al. .............................. | 236/46 R |
| 5,505,377 | 4/1996 | Weiss ..................................... | 364/528.13 |
| 5,544,809 | 8/1996 | Keating et al. ............................ | 236/47 |

*Primary Examiner*—Hal Dodge Wachsman
*Attorney, Agent, or Firm*—David W. Wong

[57] ABSTRACT

The multi-function energy management system has a plurality of predetermined operating programs stored in memory in or around a micro controller. The micro controller may be pre-set to operate a plurality of heating ventilation, air conditioning and other operating devices according to selected ones of such operating programs for maintaining the temperature in a room of a building at a desired ambient temperature condition and other loads at various operating conditions. The system has a continuously operating internal clock with a back up battery having a life span of ten years. Adjustment allowance is provided in the clock for leap years and daylight savings time. The system is capable of selectively operating the heating, ventilation, air conditioning devices and other energy consuming devices such as lighting, thermal storage heaters according to the occupancy of the room to provide a maximum saving of energy consumption.

16 Claims, 24 Drawing Sheets

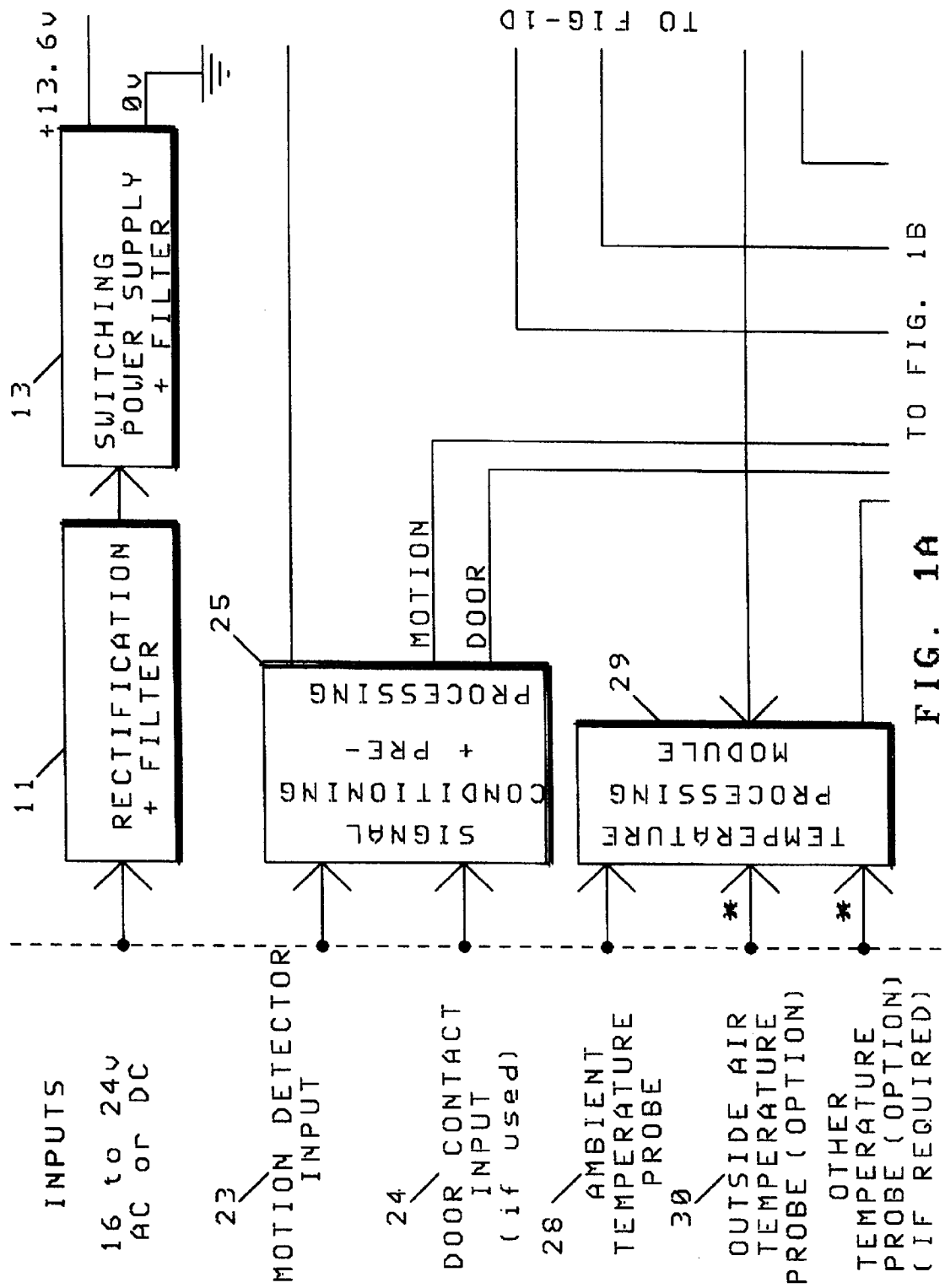

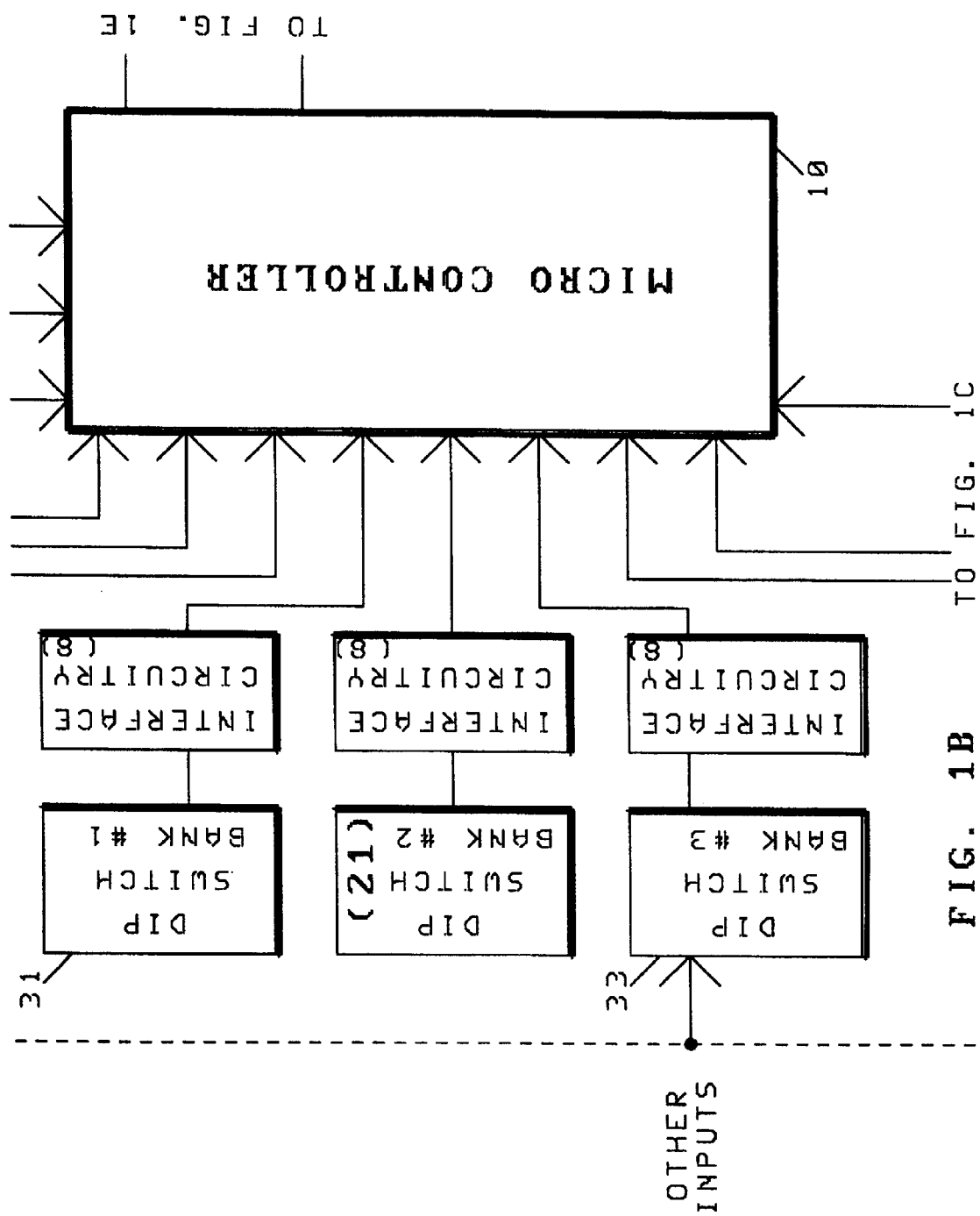

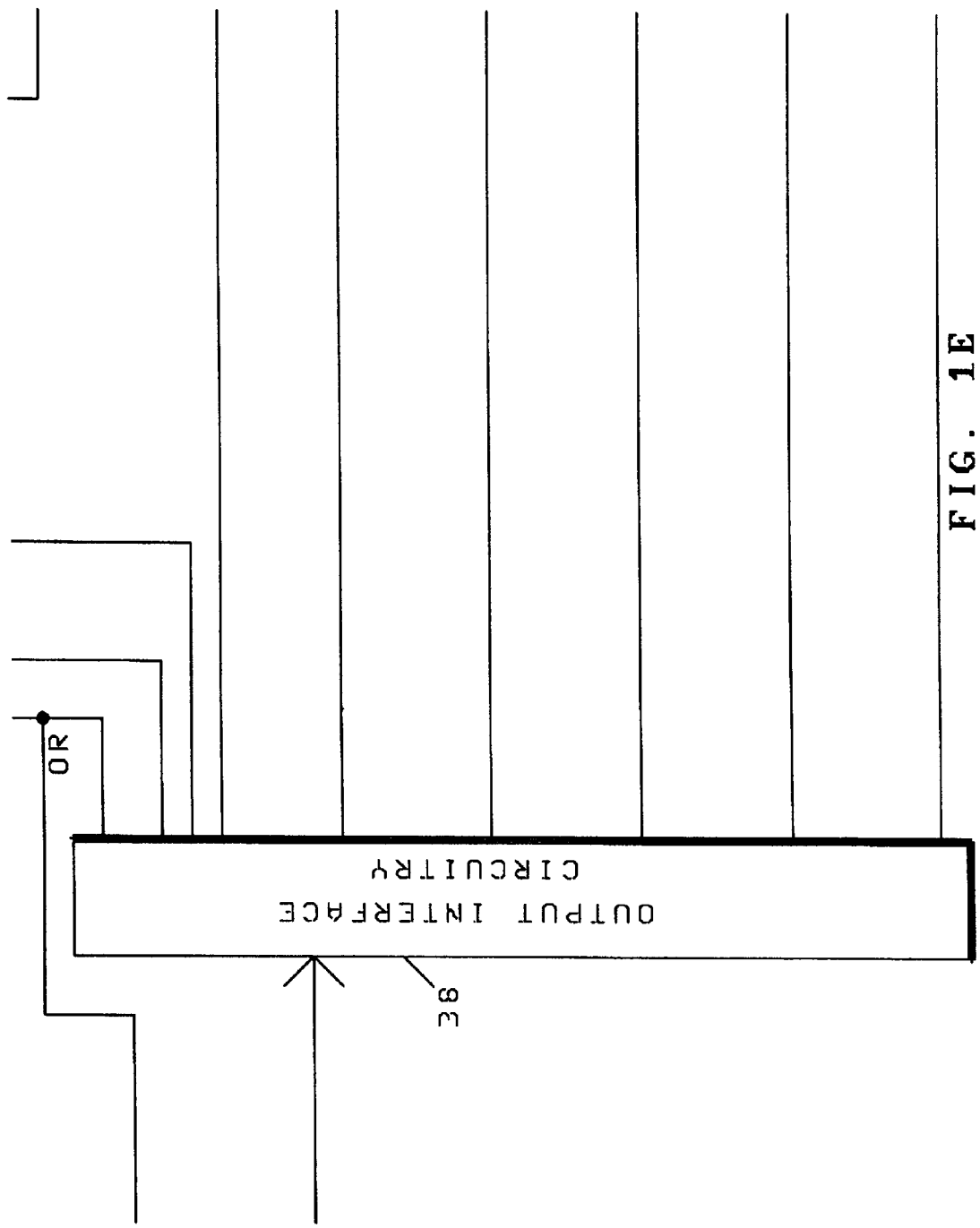

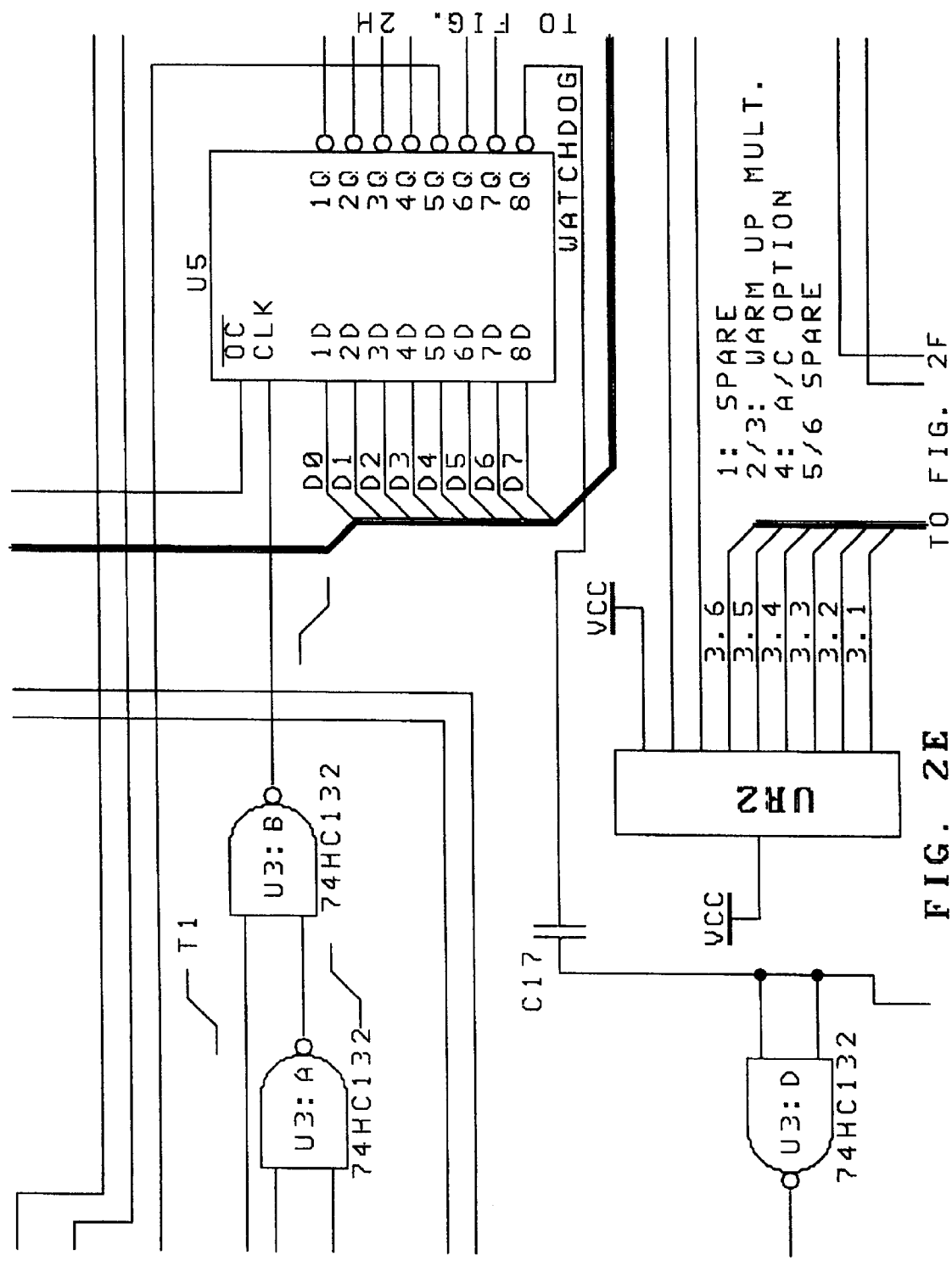

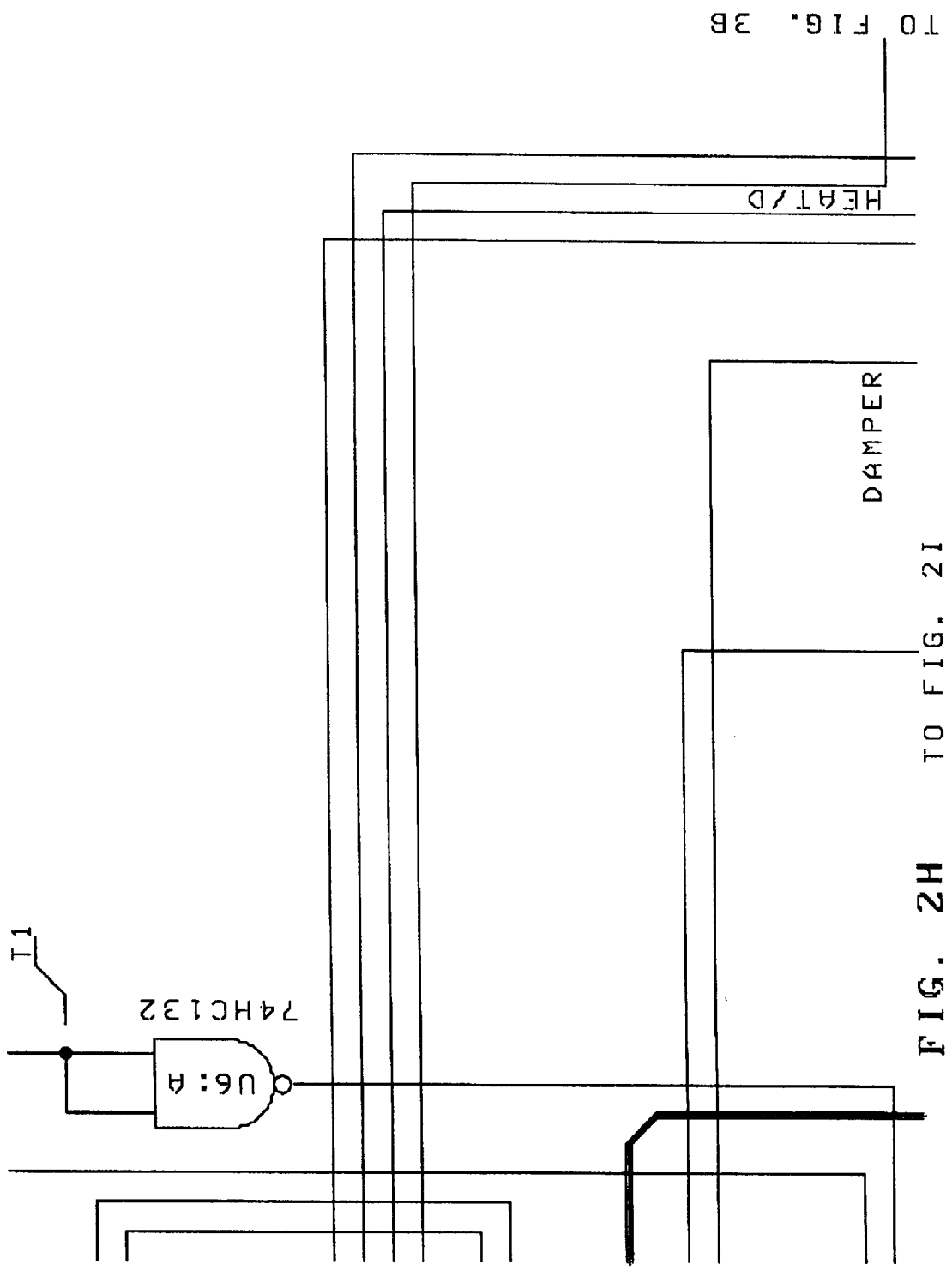

CONTROL APPARATUS AND METHOD FOR MAXIMIZING ENERGY SAVING IN OPERATION OF HVAC EQUIPMENT AND THE LIKE

BACKGROUND OF THE DISCLOSURE

This invention relates to energy management systems and more particularly relates to devices and methods for automatically controlling the heating, cooling, ventilation, lighting and other devices in a building to provide a maximum saving of energy. The system is particularly suitable for automatic energy management for a school, office building or a home in which various rooms have a somewhat known occupancy schedule or pattern throughout the year.

A large amount of energy is consumed in the operations of heating, cooling, ventilation, lighting and other loads in a building. Commonly, the heating and cooling operations are controlled automatically with a thermostat or a plurality of thermostates are provided, which initiate these operations according to pre-set temperature limits. The thermostat is located at predetermined central location or the plurality of thermostats are located at predetermined locations in the building. During winter months, the thermostat, set in the heating mode, would commence the operation of the heating equipment when it detects that the ambient temperature in the building has fallen below a pre-set lower temperature limit; and it would turn off the heating equipment when the ambient temperature in the building has reached a pre-set upper temperature limit. In the summer months, the thermostat, set in the cooling mode, would initiate the operation of the cooling equipment when the room ambient temperature has risen above a pre-set upper temperature limit, and it would terminate the operation of the cooling equipment when the ambient temperature has been cooled to a pre-set lower temperature limit. The thermostat would initiate the selected operations regardless of whether or not the building is occupied. Since many buildings may be unoccupied for certain periods of time, the continued operation of the heating or cooling equipment during such unoccupied periods would result in the wastage of a large amount of energy. Attempts have been made to reduce the energy wastage by incorporating a timer in the thermostat in which the timer would additionally terminate the heating or cooling operation set back to an energy saving mode according to certain predetermined time periods of the day at a lower pre-set heating temperature limit or higher pre-set cooling temperature limit when the building is expected to be unoccupied. Such provision is practical only if a building has a regular occupancy schedule, for example, a home in which the residents are normally away at work during the day time, so that the heating and cooling operations may be set back to the energy saving mode. However, such provision may not be used in a school building, office building or in a home in which the occupancy of various rooms may not be regular. This drawback is somewhat alleviated by some known control devices incorporating a sensor to detect the occupancy of the building so as to intercept the heating and cooling operations. Such control devices commonly are provided with programming devices such as a touch panel with which the user would set various functions and operating programs for the heating, ventilation and air conditioning devices. It has been found that most users do not understand how to pre-set such operating programs, resulting in the improper setting or no setting at all of the operating programs and unnecessary wastage of energy.

SUMMARY OF THE INVENTION

It is a principal object of the present invention to provide an energy management system which is capable of operating selectively the heating, ventilation, air conditioning, lighting and other energy consuming devices according to predetermined operating programs in order to maintain a room in a building at a desired ambient condition and to maximize energy savings.

It is another object of the present invention to provide an energy management system which monitors the operation of heating, ventilation, air conditioning, and various other devices to operate in an efficient manner all year round.

It is another object of the present invention to provide an energy management system which automatically and accurately determines the occupancy of a room in a building to operate various environment control devices such as heating, ventilation, air conditioning and other devices to maintain it at a desired ambient condition according to the detected occupancy. It provides a precise way to detect occupancy of the room and to provide a precise way to start preheat of the room during cold weather and to monitor the room progress in real time.

It is another object of the present invention to provide an energy management system which is easy to operate and requires little understanding by the user of the technical operations of the system.

It is yet another object of the present invention to provide an energy management system which is relatively maintenance free for a long period of time.

The energy management system comprises a micro controller means having a plurality of memory means operative to store therein a plurality of predetermined programs for operating energy consuming equipment. A plurality of actuating members are connected to the micro controller means and are operative for selecting the plurality of predetermined programs for setting desired ambient conditions for a room in the building. Output interface circuit means is connected to the micro controller means and is operative to generate a plurality of output signals according to the plurality of predetermined programs selected. An output stage interface means is connected to the output interface circuit means and is operative to receive the output signals therefrom. Energy consuming equipment means is connected to the output stage interface means and is operative by the output stage interface means for maintaining the room in the desired ambient conditions.

A method of controlling efficient energy consumption of the operation of heating, ventilation, air conditioning, lighting and other equipment in a building for obtaining desired pre-set ambient conditions in a selected room therein comprises storing a plurality of predetermined operating program in a micro controller means, setting the micro controlling means to operate selected ones of said predetermined operating programs including selecting the desired pre-set ambient conditions, detecting the occupancy of the room with a motion detecting means located in the room and a contact means mounted at an entrance door of the room, the contact means and the motion detecting means such as an infra-red beam, or an under mat contact, or a proximity sensor cooperating to address the micro controller means to determine the occupancy of the room according to the operating programs for operating the energy consuming equipment to obtain the desired pre-set ambient conditions.

BRIEF DESCRIPTION OF THE DRAWINGS

FIGS. 1A through 1G in combination show a general schematic block diagram illustrating the energy management system according to the present invention.

FIGS. 2A through 2I in combination show is part of an exemplary circuit diagram of the energy management system according to the present invention.

DETAILED DESCRIPTION OF THE PREFERRED EMBODIMENTS

Figure 1C:
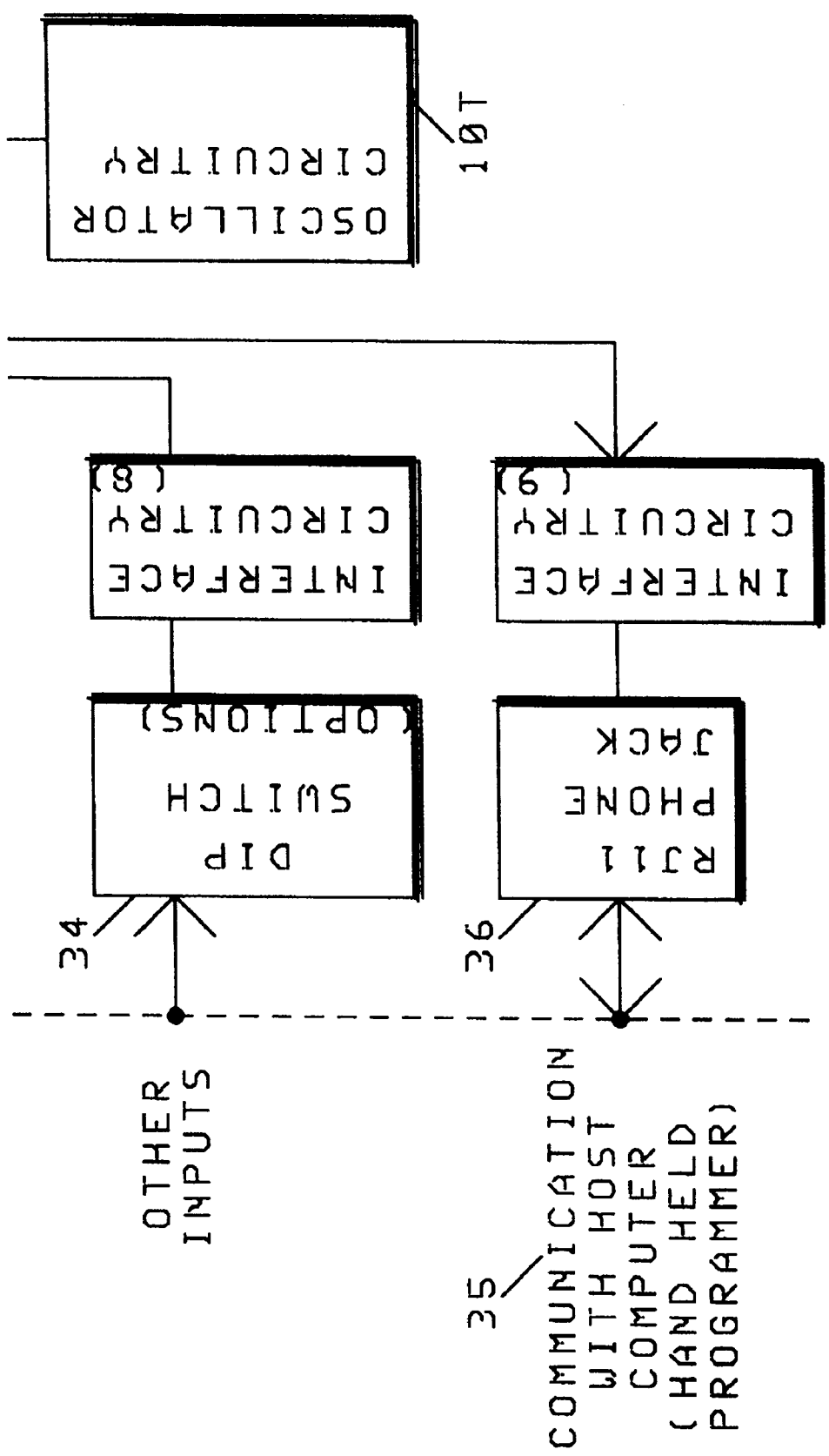
Figure 1D:
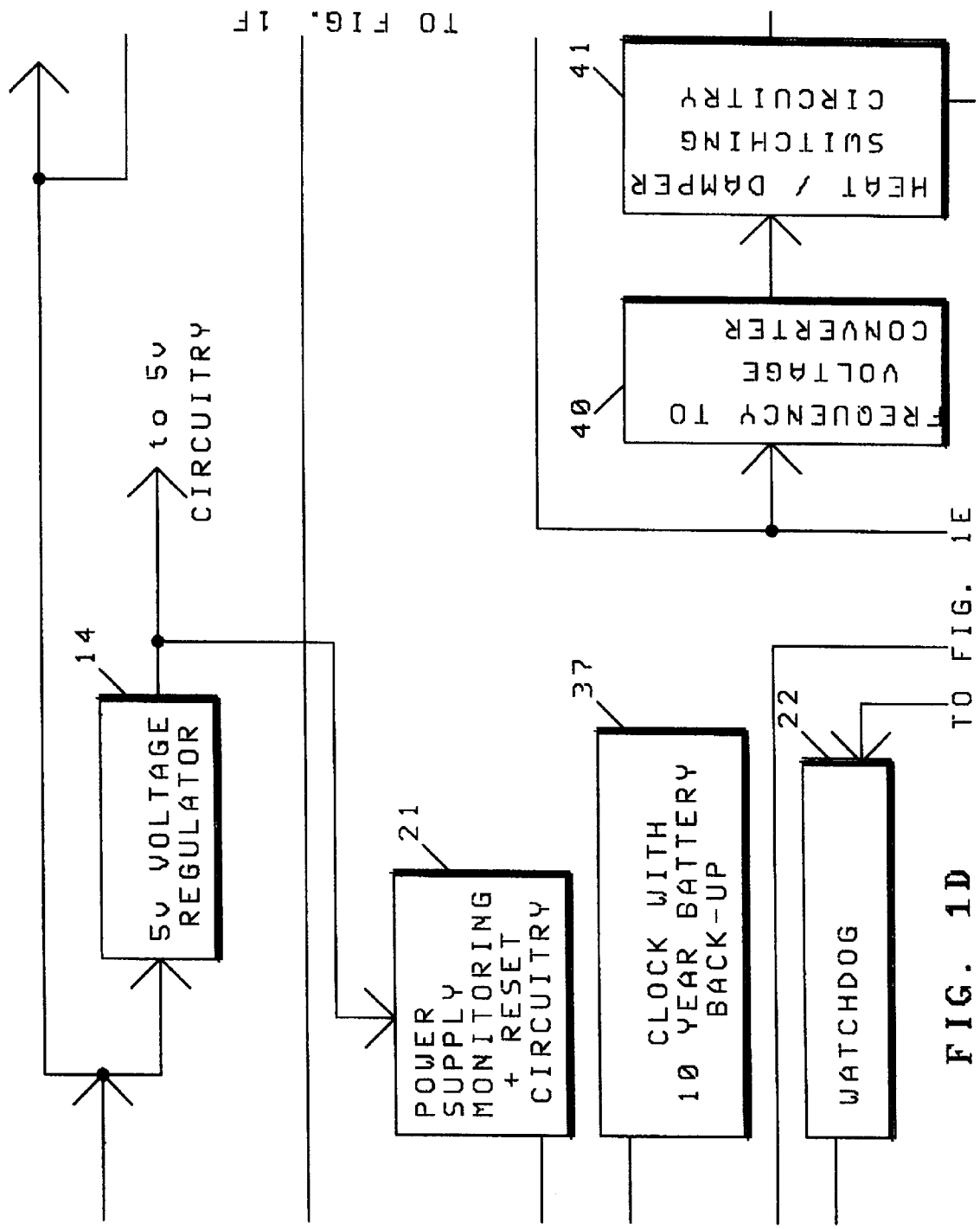
Figure 1F:
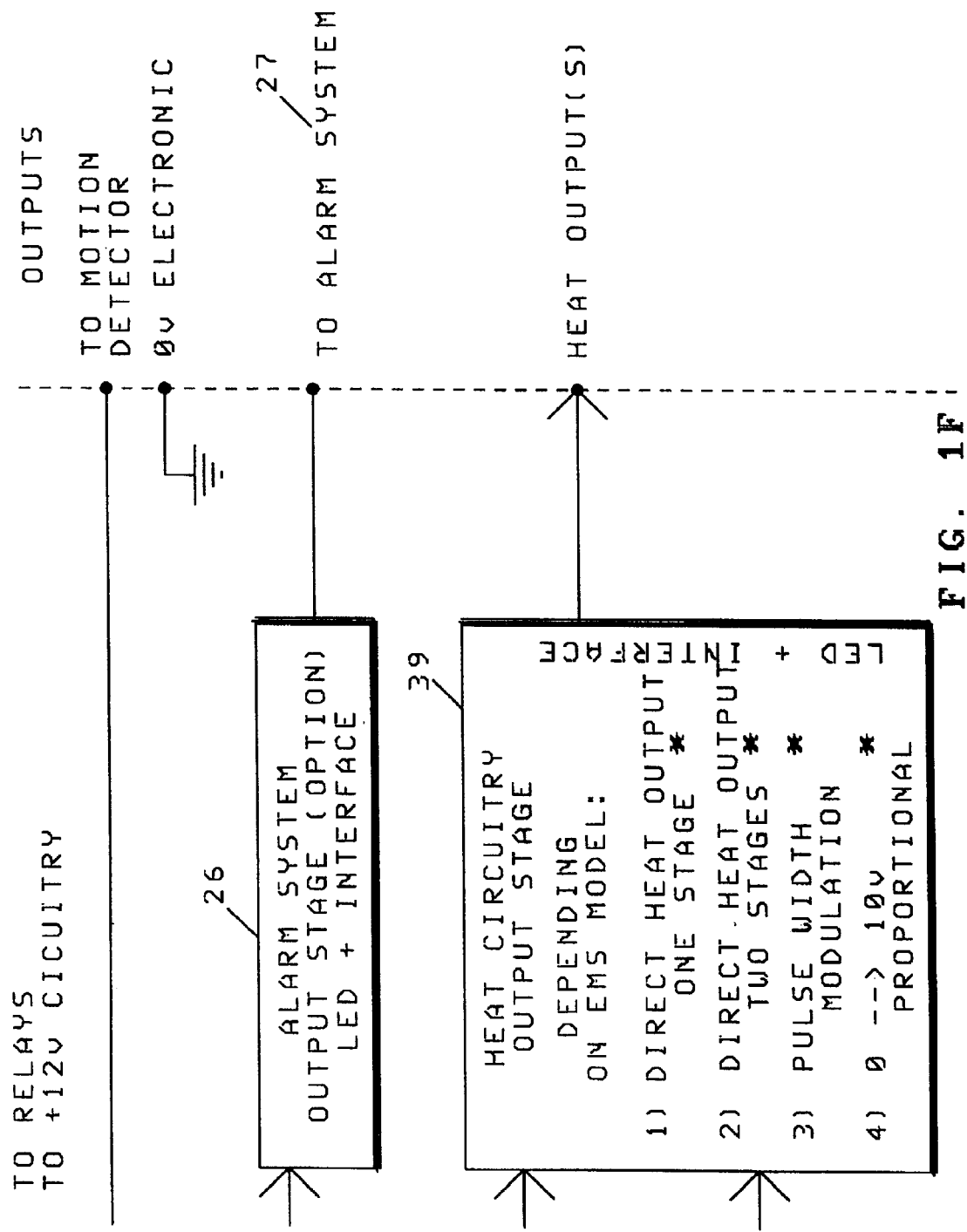
Figure 1G:
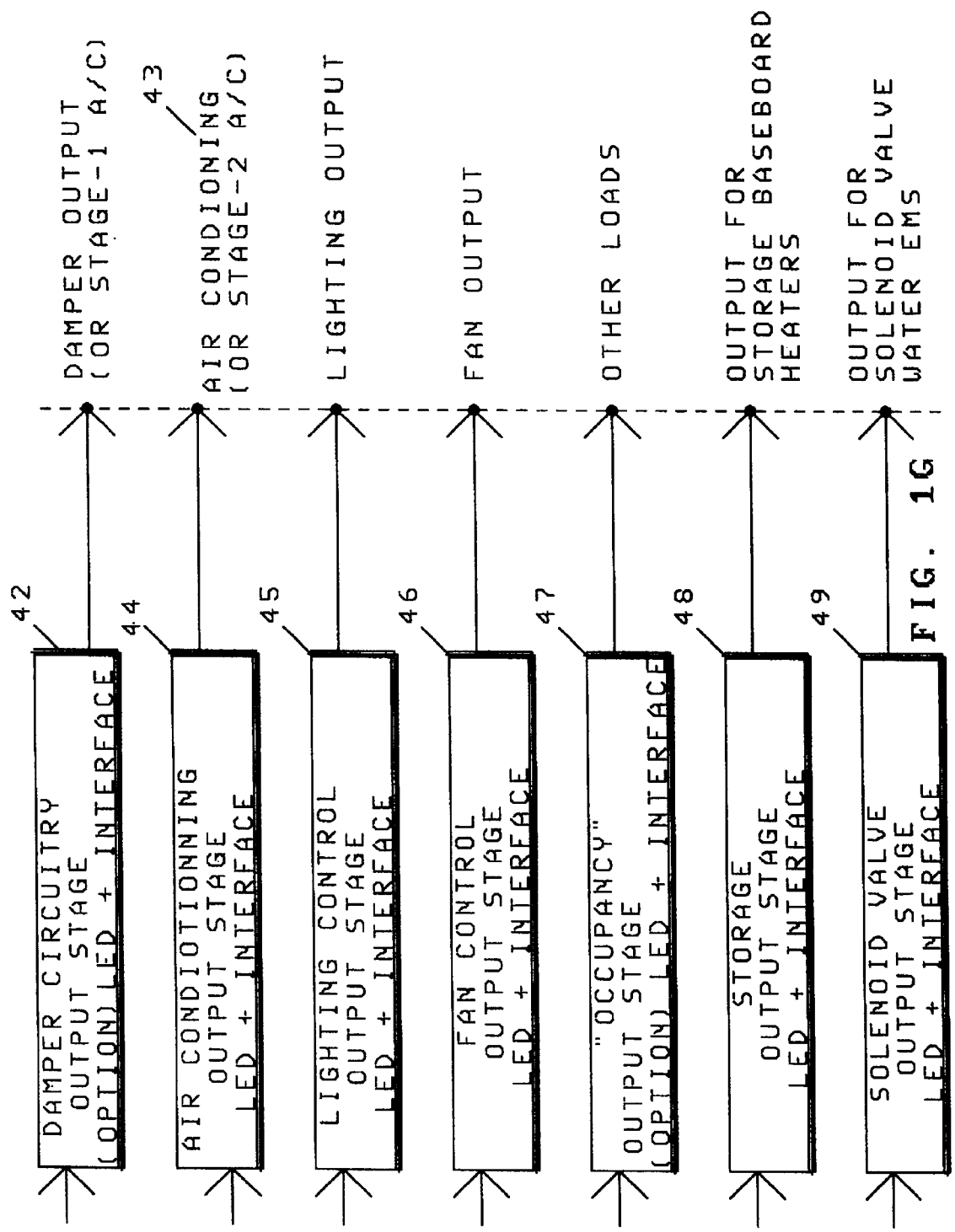
Figure 2A:
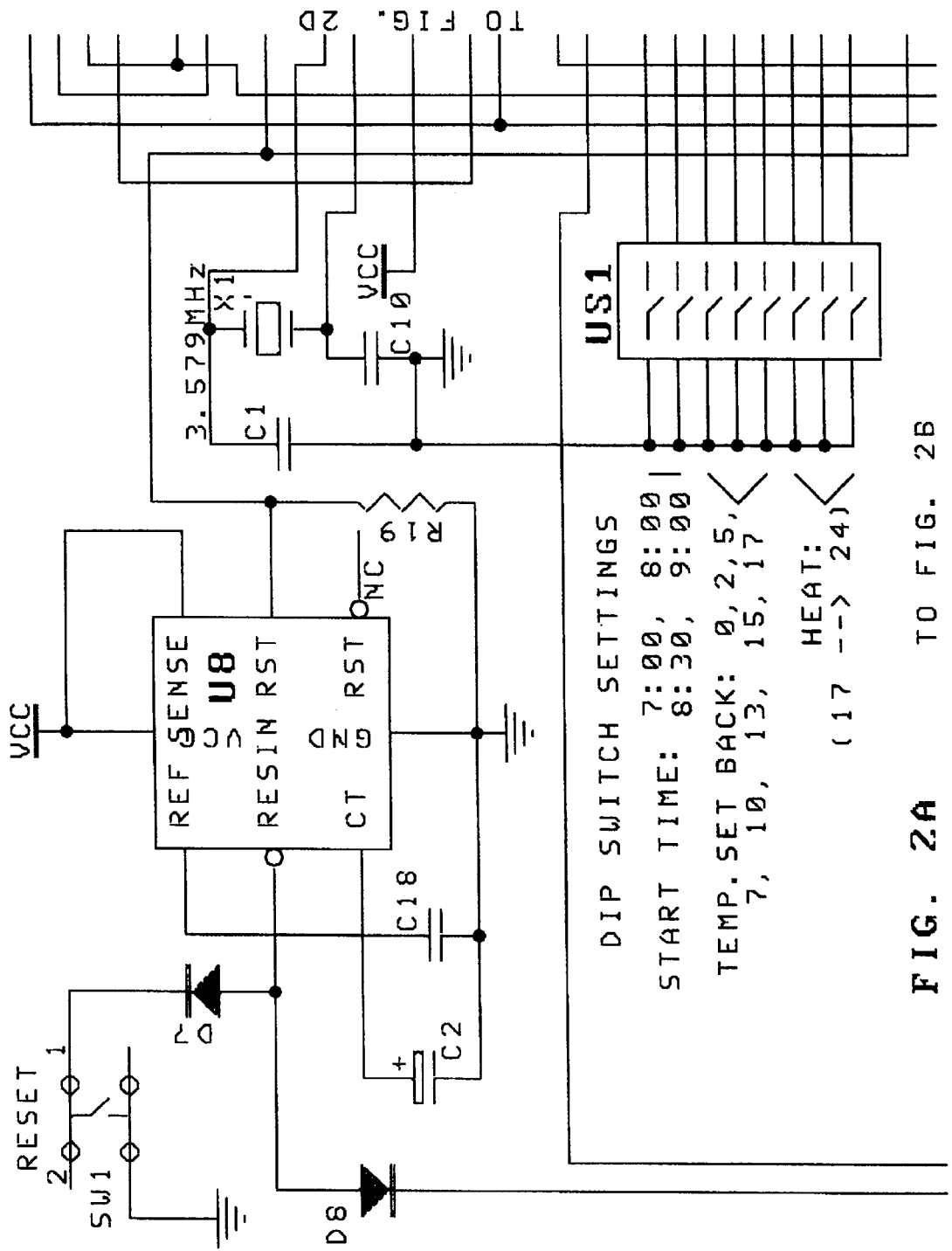
Figure 2B:
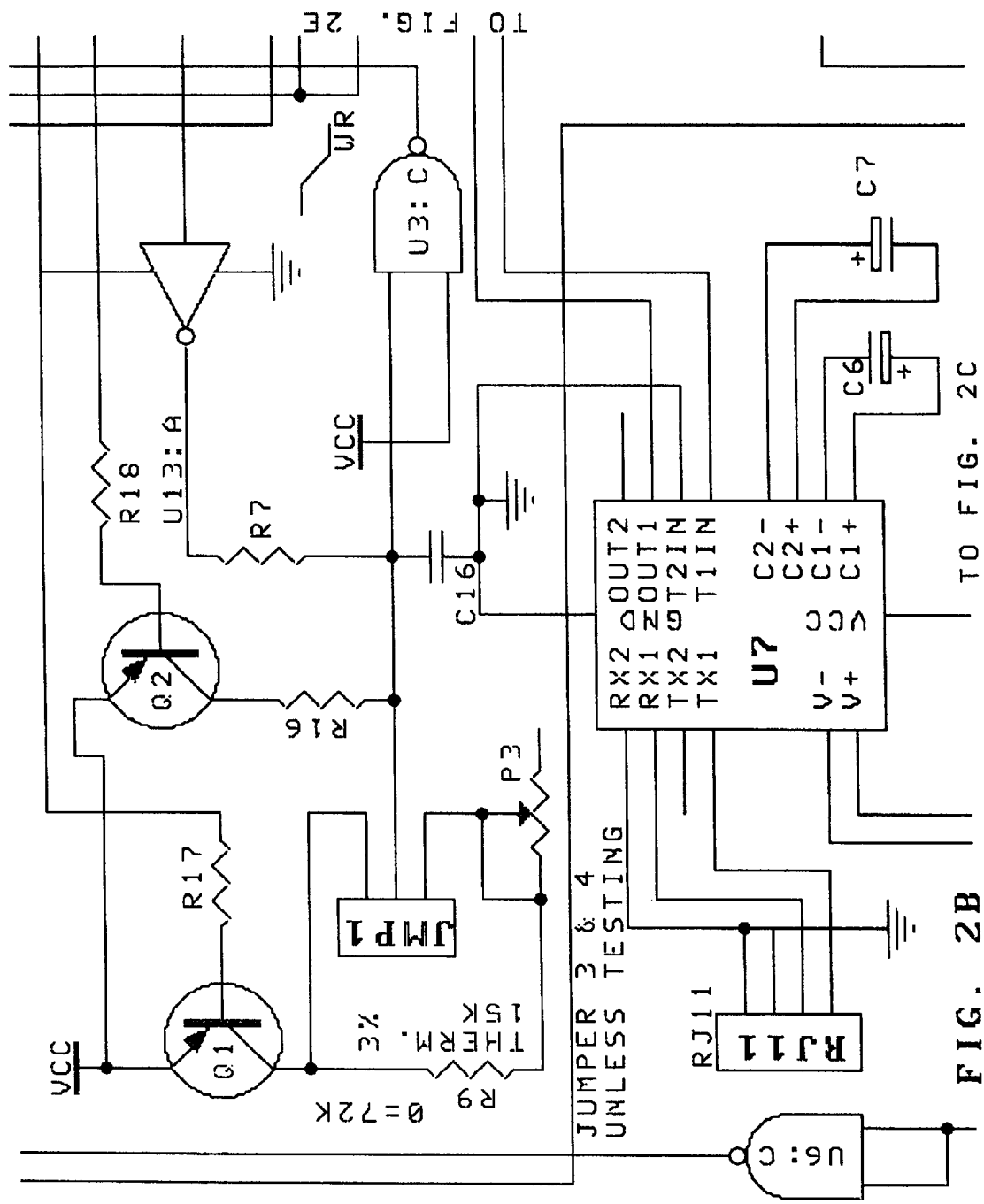
Figure 2C:
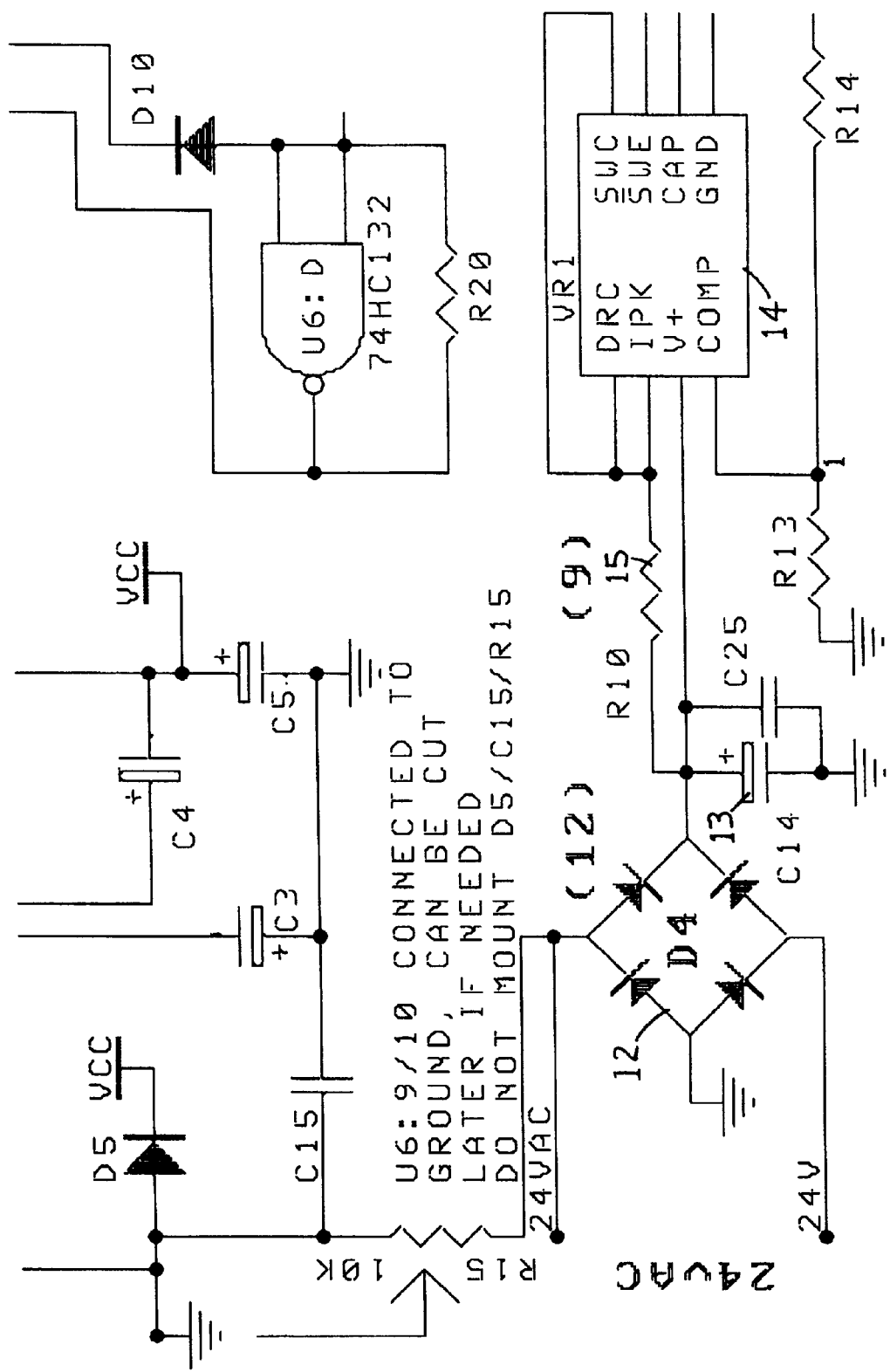
Figure 2D:
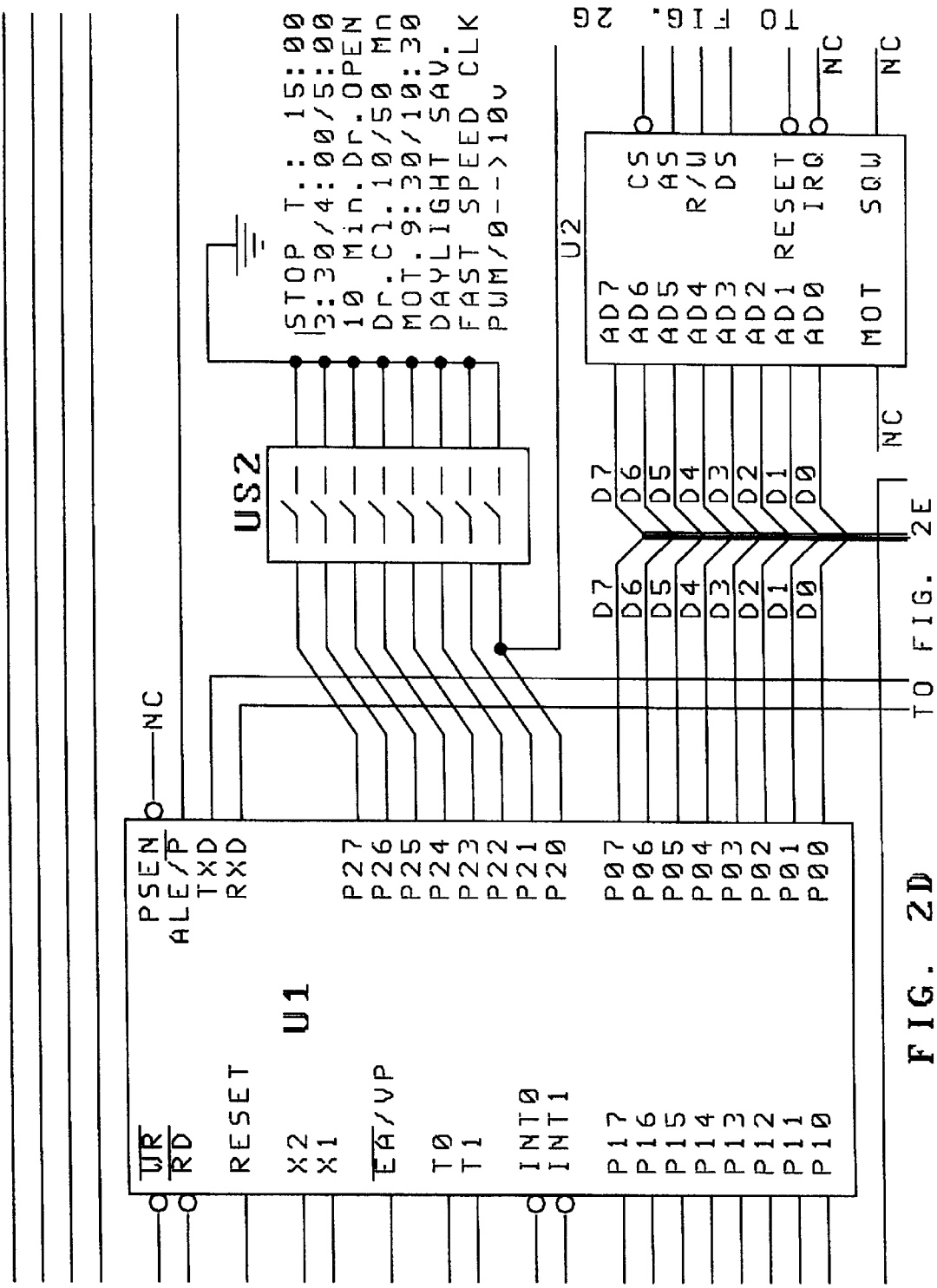
Figure 2F:
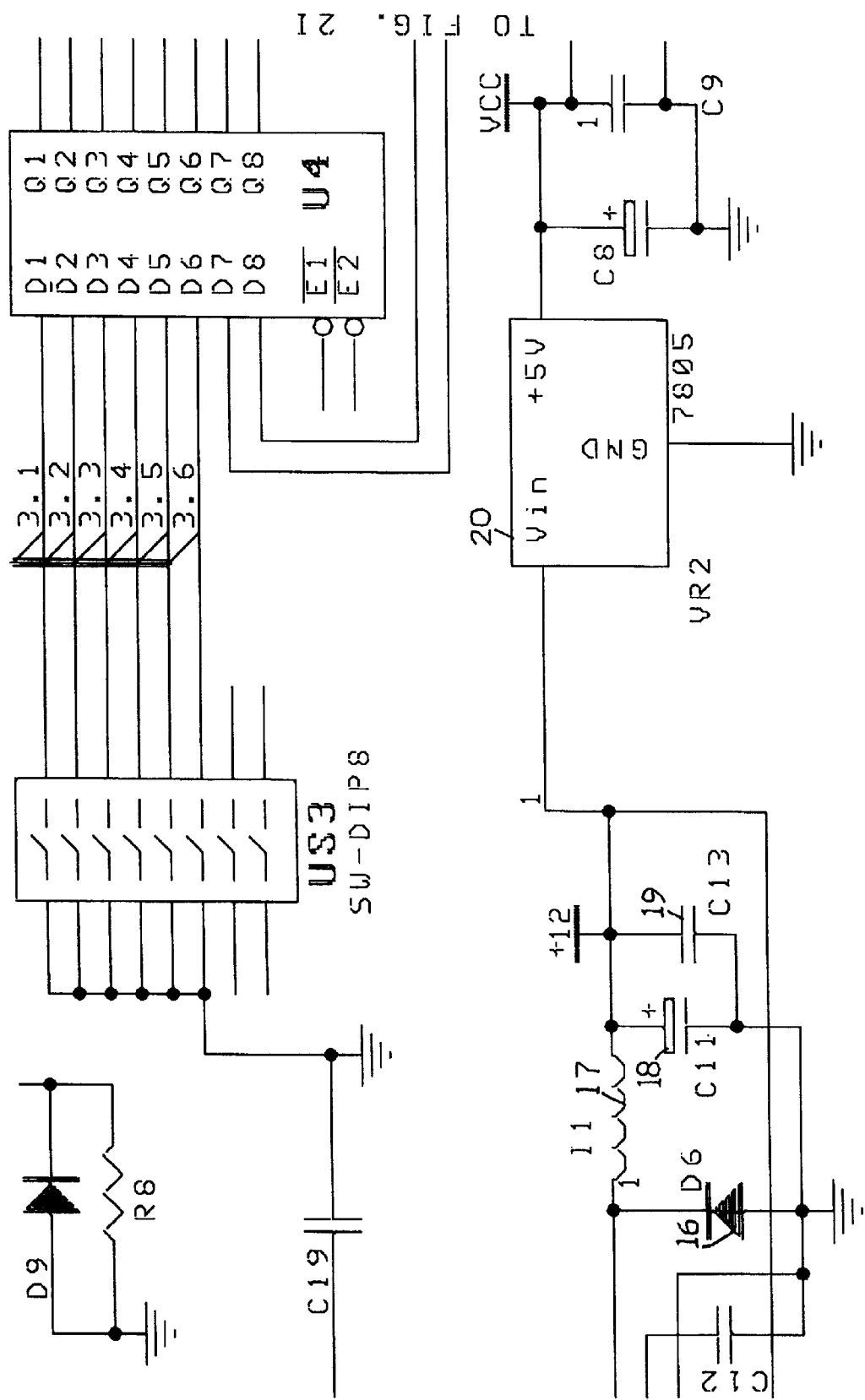
Figure 2G:
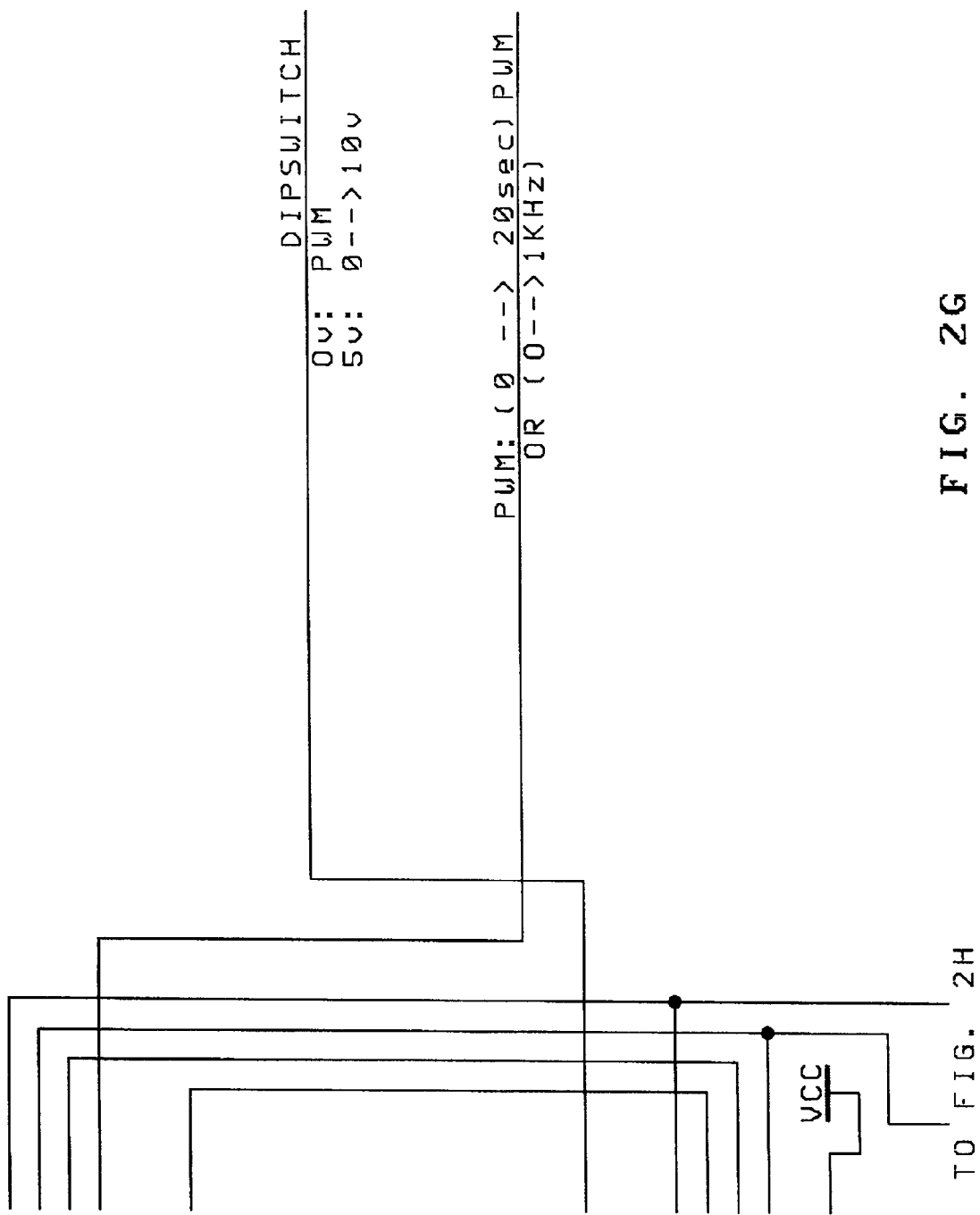
Figure 2I:
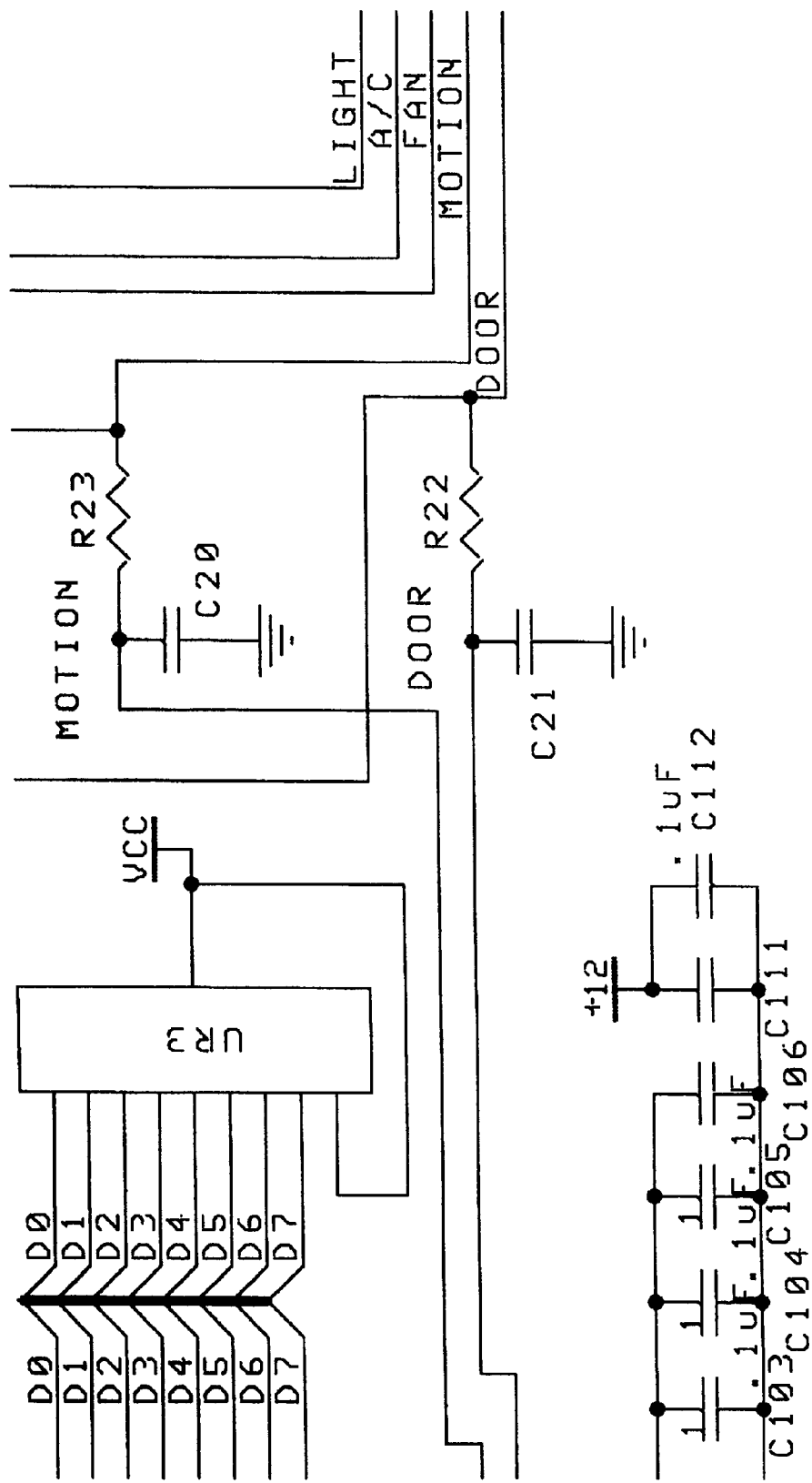
Figure 3A:
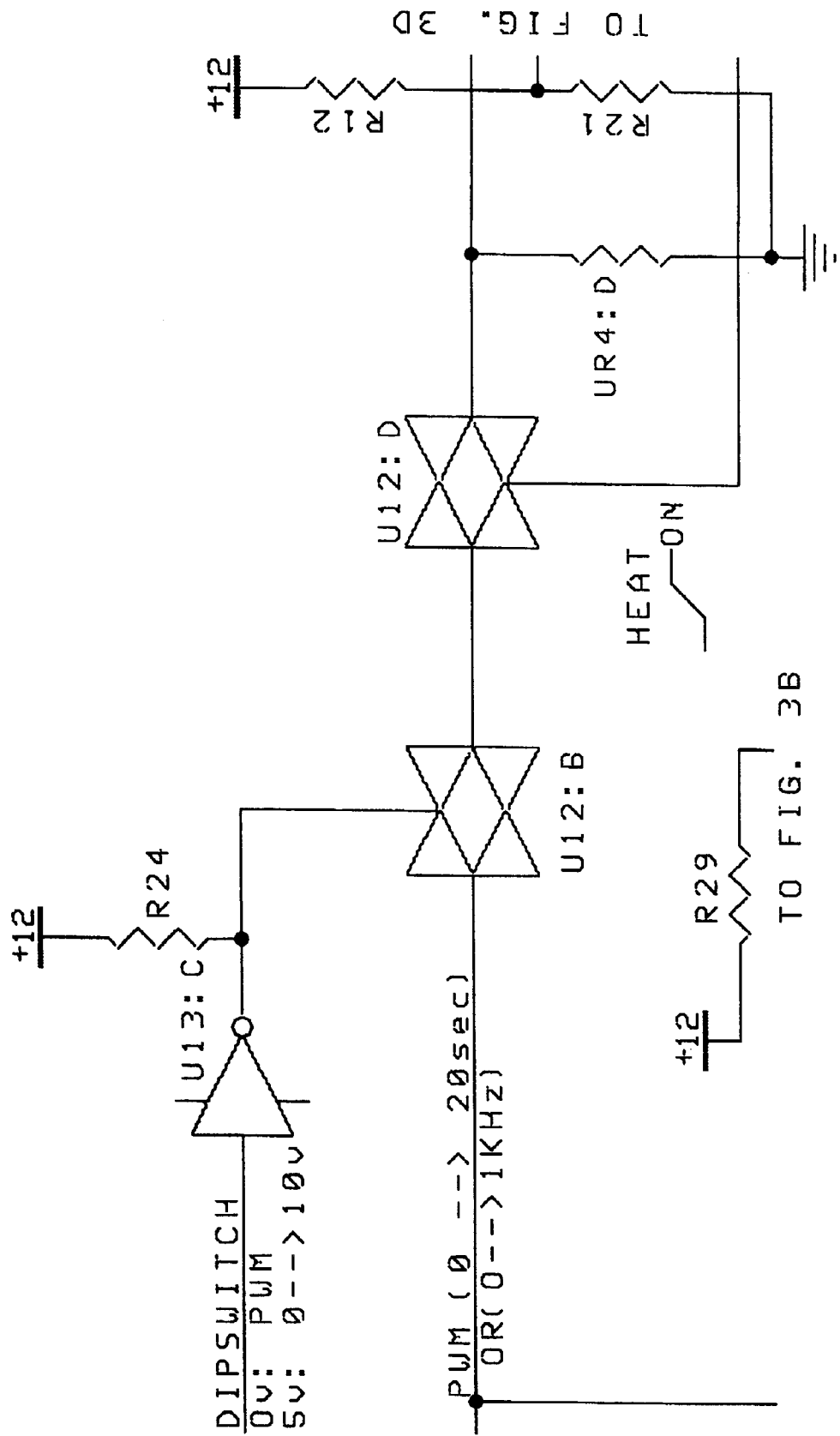
FIGS. 3A through 3H in combination show is the remaining part of the exemplary circuit diagram of the energy management system according to the present invention.
Figure 3B:
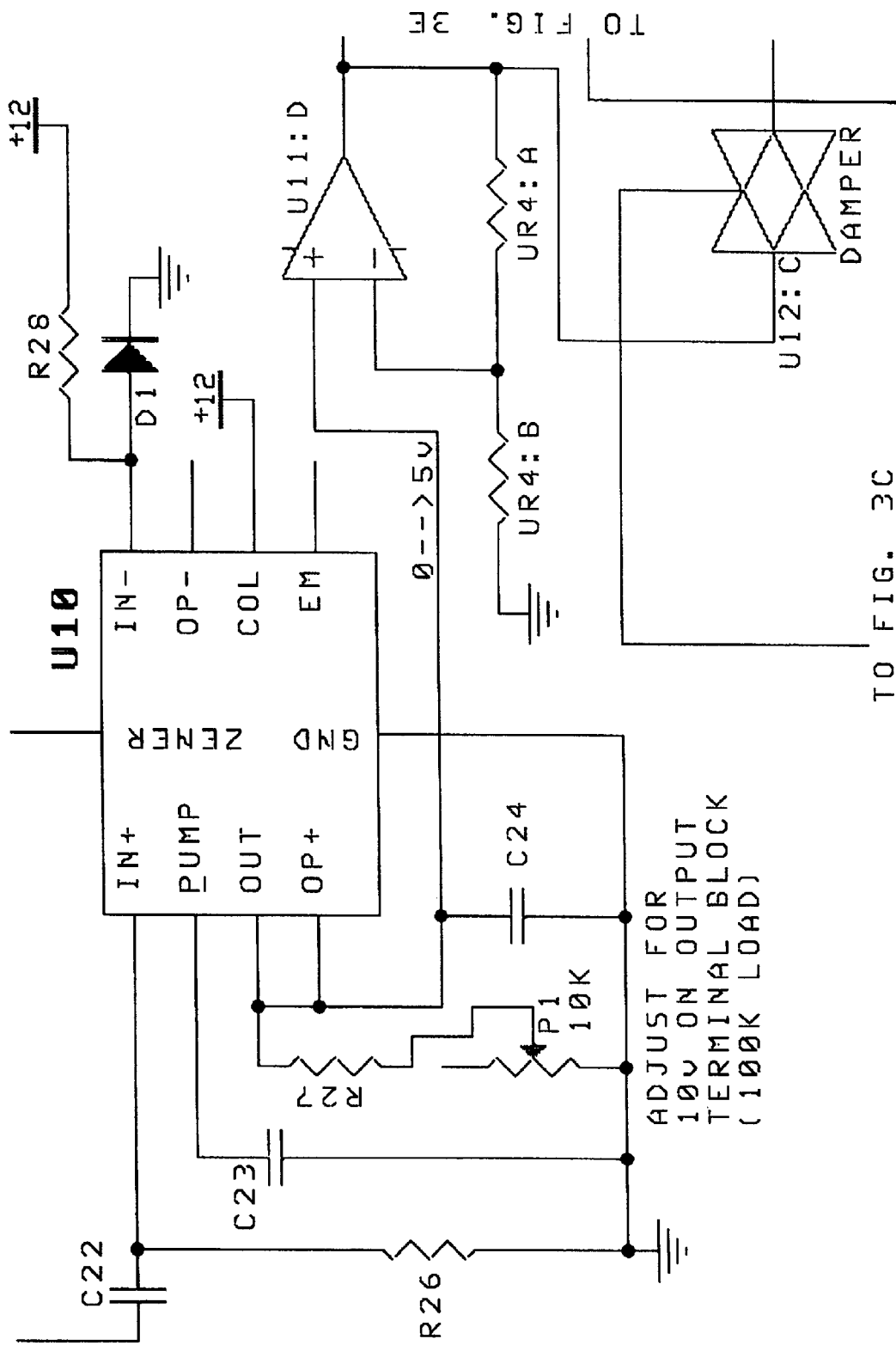
Figure 3C:
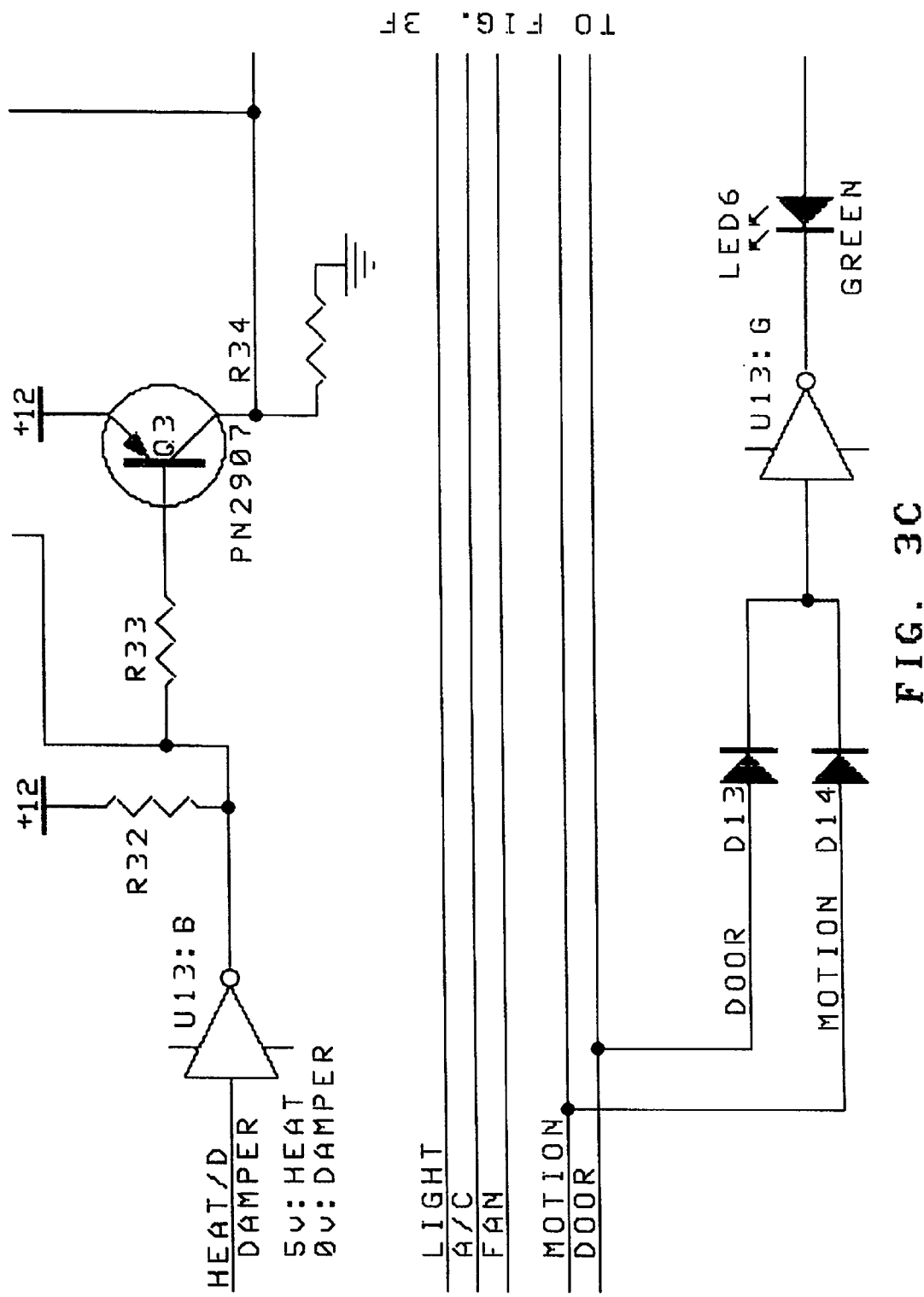
Figure 3D:
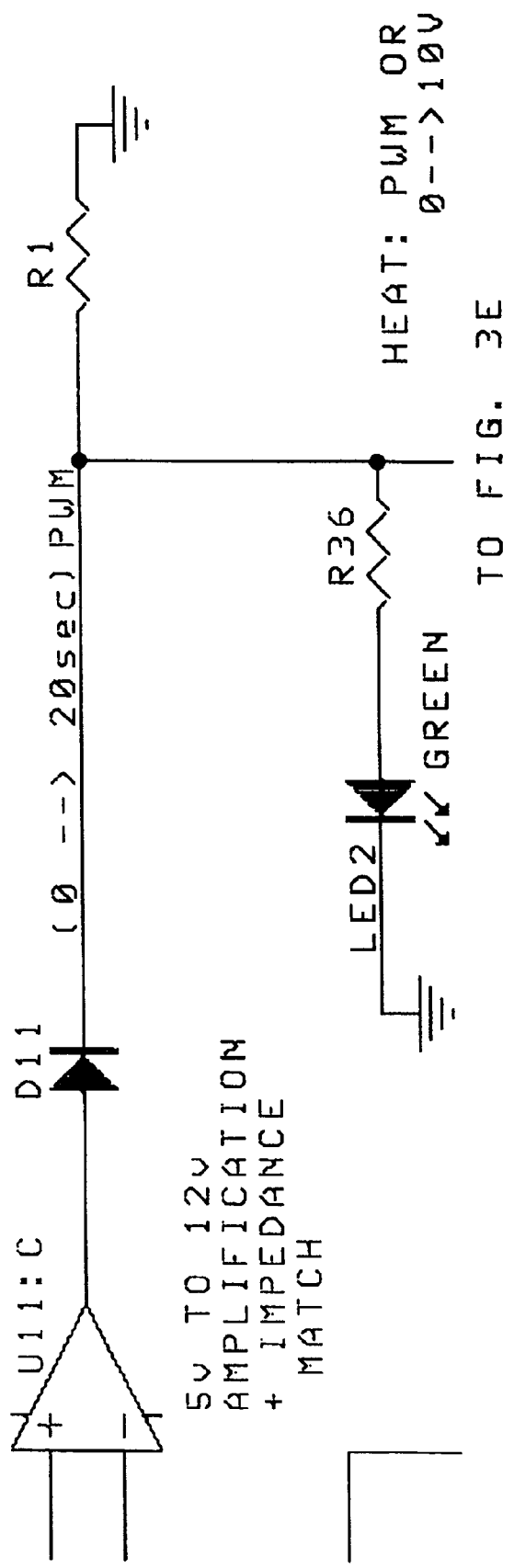
Figure 3E:
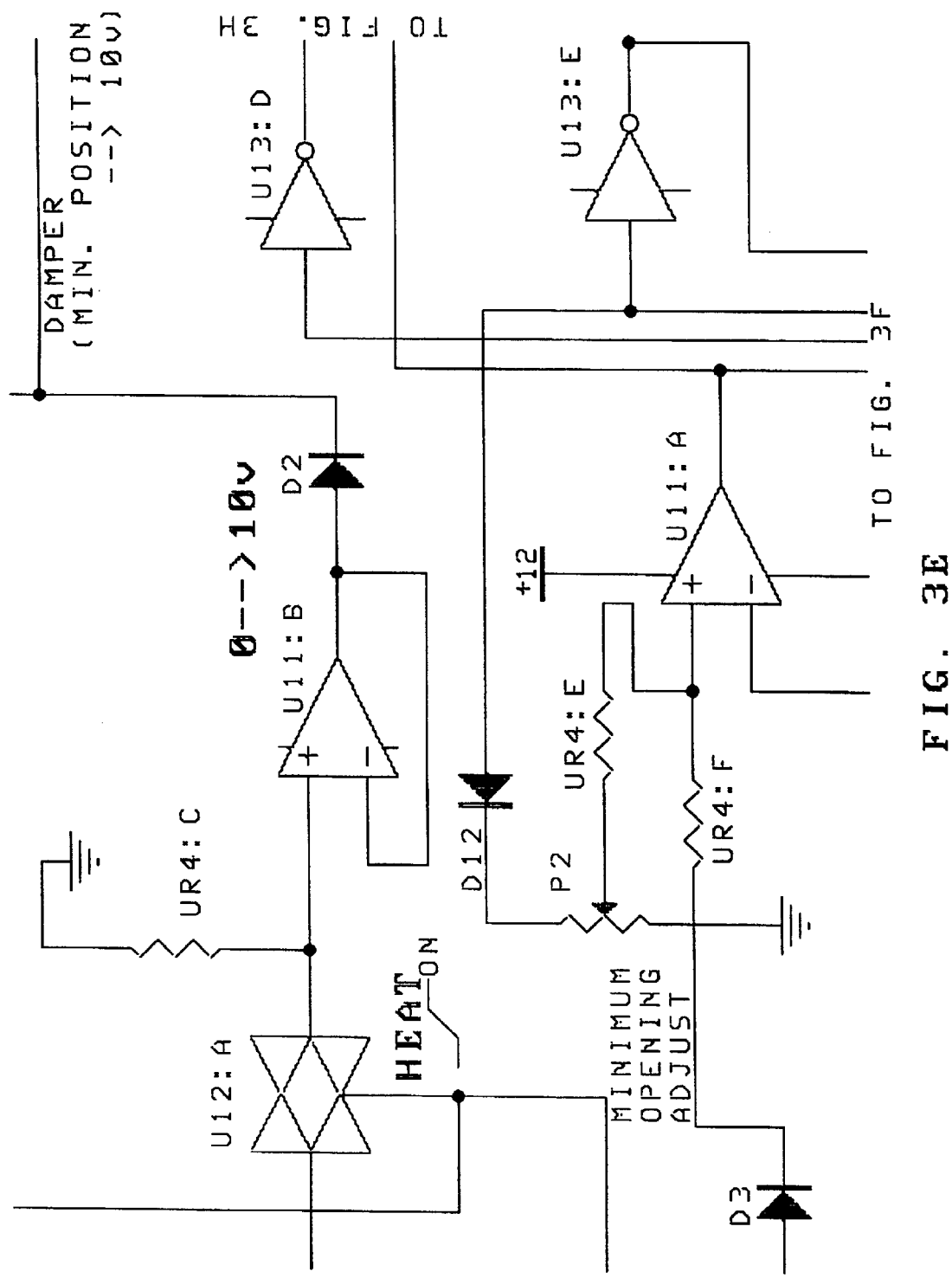
Figure 3F:
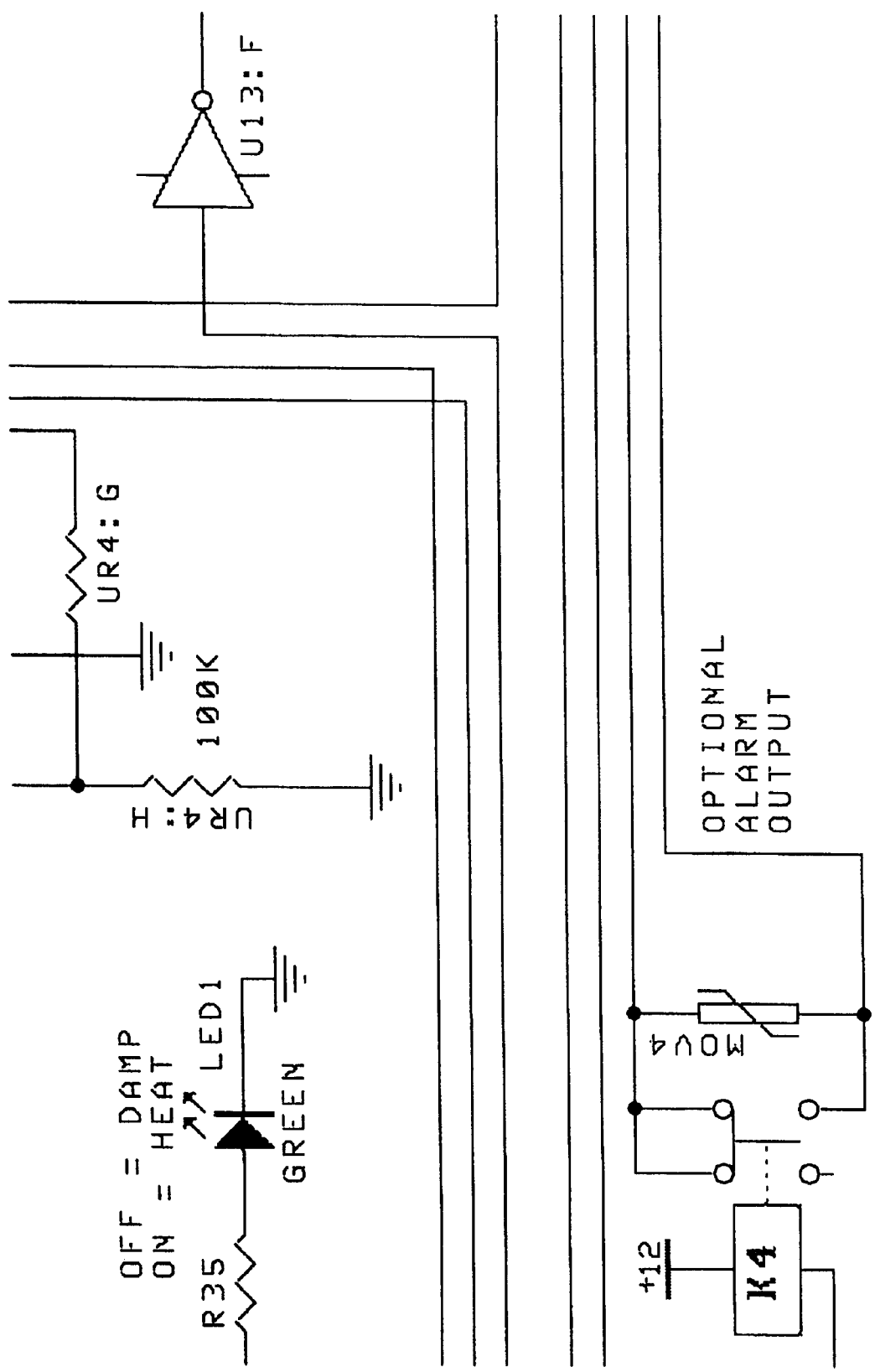
Figure 3G:
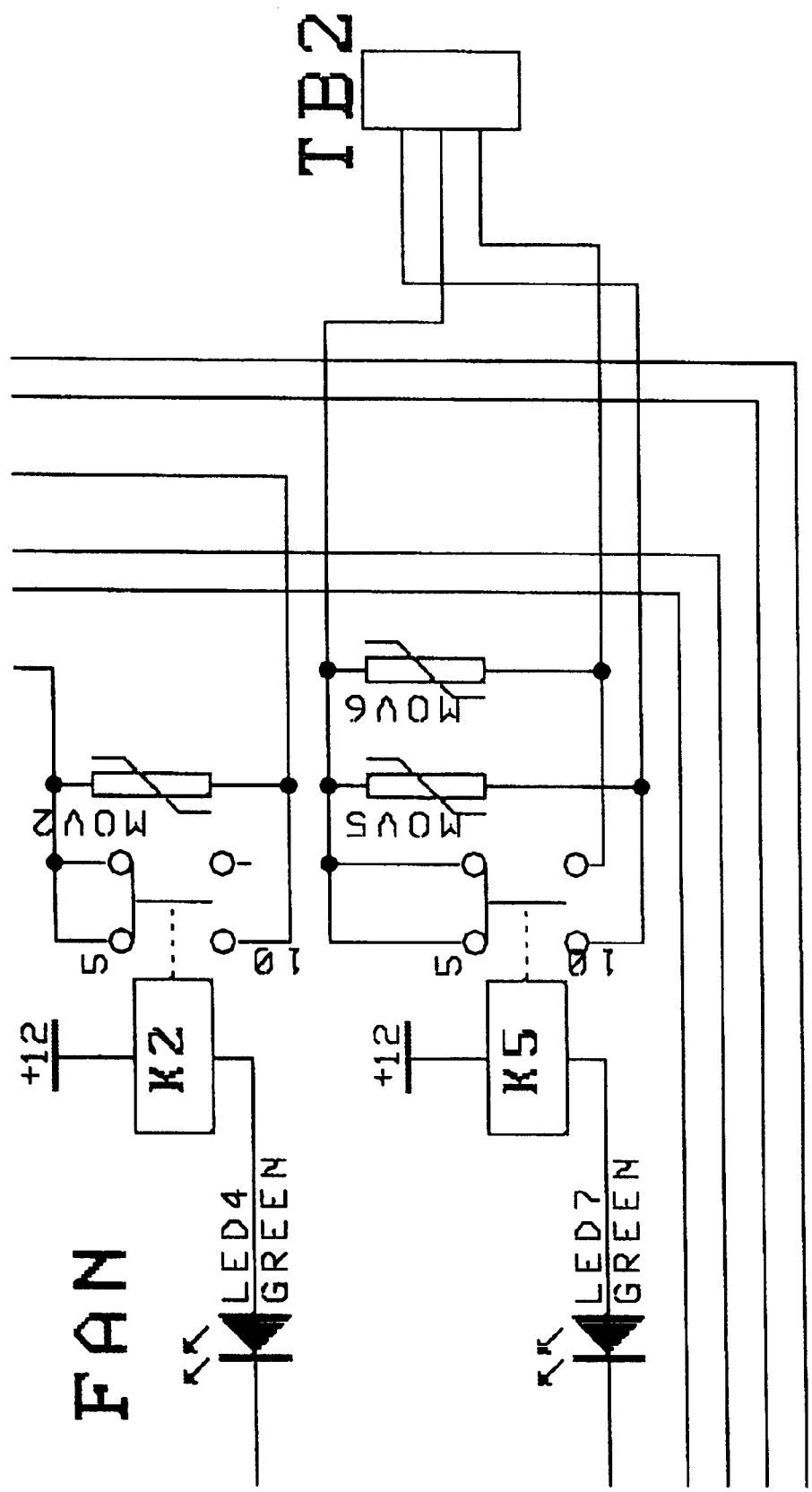
Figure 3H:
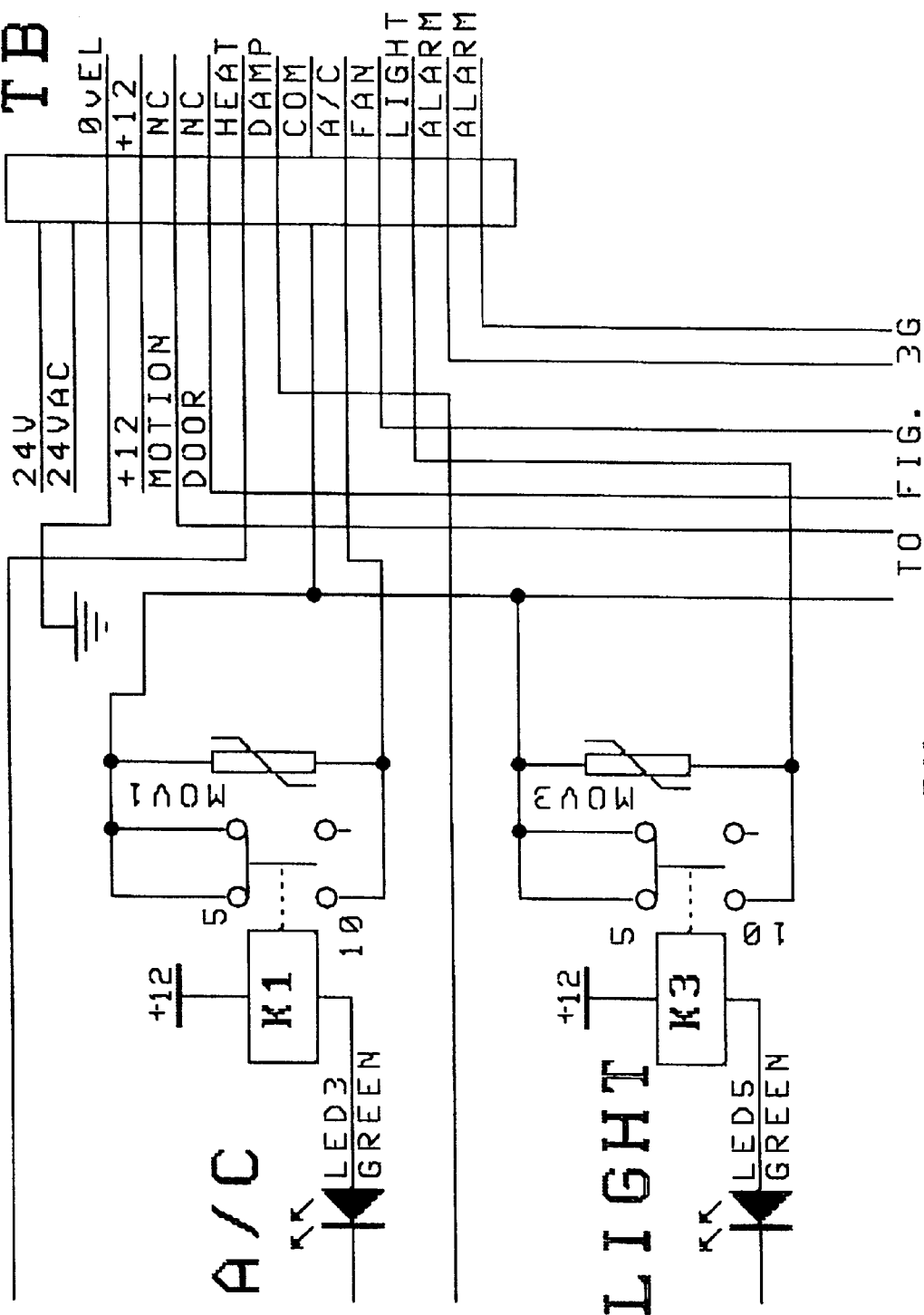

With reference to the drawings which show an exemplary embodiment of the energy management system according to the present invention, the entire micro controller based unit may be housed in a relatively small enclosure which may be easily retrofit in existing buildings. Like reference numerals in the various drawings designate corresponding parts. The main functions of the system are monitored by a micro controller 10 which may be pre-programmed for a predetermined long period of time such as twenty years. The system is provided with a rectification filter 11 which can be fed by a wide range of voltages, for example, from 16 volts to 30 volt DC, and from 16 volts to 24 volts AC. Such provision alleviates any problems for an inexperienced installer of the system to reverse the polarity of the system input erroneously. The rectification filter 11 as more specifically shown in FIGS. 2C, 2F, and 2I is provided with an oversized bridge rectifier 12 and capacitive filters 13 connected across its output terminals. Typically, a 1 Amp rating bridge rectifier 12 is used although only 200 mAmp is required. This provision safeguards the integrity of the rectification filter 11. The voltage from the rectification filter 11 is fed to a switching power supply 14 through a current limiting resistor 15. The role of the current limiting resistor 15 is to limit the current in case of a short circuit in the system. In such event, the voltage drop across the resistor 15 will be high and the switching power supply will automatically limit the current according to the voltage drop across the current limiting resistor 15. The output of the switching power supply incorporates a fast recovery diode 16, an inductor 17 and a large value electrolytic capacitor 18 to smooth out the current and voltage, a low value ceramic capacitor 19 is also included in the circuit to take care of high frequency noise. Part of the output voltage is re-injected to the switching power supply via a divider 20 for a precise control of the output voltage. The filtered output supplies all the 12 volt circuitry in the system including the relays, op-amp, analog switch as well as part of the circuitry feeding a 5 volts voltage regulator 14 which provides the operating 5 volts voltage for all the logic integrated circuits. To further enhance the reliability of the circuitry, a power supply monitoring circuit 21 is provided on the 5 volts power supply. If the voltage deviates beyond a predetermined tolerance, the monitoring circuit 21 automatically generates a reset. The reset may also be initiated manually by actuating a push button on the main board or by a watchdog circuit 22 which ensures the reset functions at the correct timing.

In common energy management systems, motion detectors are usually employed to initiate the operations of the lighting and heating in a building. The main drawback of such known systems is that the motion detectors would turn off the lighting or heating when there is not sufficient motion detected. Such motionless condition often occurs, for example, when a person within the sensing area remains at the same location in the room and is seemingly motionless such as working with a computer, or when a teacher is sitting at a desk for a relatively long period of time correcting papers. The energy management system of the present invention obviates the above drawback by operating a presence detection device or other similar proximity sensor in conjunction with a door contact. After the entrance door of a room is closed, the presence detection device is given a predetermined period of time, for example, 10 minutes, to detect the presence of a person in the room. If no presence has been detected during such 10 minute duration, the micro controller determines that there is no person present in the room, and it turns off the lights, external ventilation etc in the room. Depending on the time of day and day of the week, it will either leave the heating at the normal setting(e.g. from 08:00 to 15:30) or set back the heating (e.g. after 15:30). On the other hand, if the slightest presence is detected during the predetermined time, then the fact that the room is occupied is memorized by the micro controller 10; the system does not take any further action as far as occupancy is concerned until the door is opened then closed again at which time the occupancy condition is reassessed. The micro controller 10 memorizes the status of the door contact; if the door is closed, the micro controller 10 checks in its memory if it was closed before; if yes, that means there is no change; if no, then it updates its memory that the door is now closed, and resets the timers. It functions similarly when the door opens. Since only simple presence is to be detected, any common motion detector may be employed. Alternatively, a mat pad, or beam detector, or proximity sensor may be employed in place of the motion detector. On the other hand, some known energy management systems require the use of expensive pulse duration motion detectors which produces an out pulse of specific duration. The motion detector 23 in the present invention may be either an integral part of the main board or mounted on the front panel of the unit enclosure or at a suitable remote location at which the motion detector senses the entire area of the room. A plurality of door contacts 24 and/or window contacts may be connected to a signal conditioning and preprocessor so that the inputs of these devices are filtered and debounced and fed to the micro controller 10. These inputs also generate a signal which is amplified in order to switch on a relay 18 to interface with an optional alarm system 27.

The temperature in the room is measured with a conventional sensor 28 such as a thermistor probe which provides a temperature signal to the micro controller 10 via a temperature processing module 29 which may be an analog to digital converter. The temperature signal from the temperature sensor 28 may be fed to a capacitor and generating an interrupt to the micro controller 10 which measures the time it takes for the capacitor to charge to a preset level. The capacitor is then discharged, then it is charged by a 1% reference resistor. The micro controller 10 measures the time it takes for the capacitor to charge to the preset level and compares it to a table stored in its memory to arrive at a temperature value. The advantages of this circuitry are that since the capacitor and preset level are used to process both the reference resistor and the probe, any error in these components nullified. To further minimize any reading errors, several readings are taken then averaged by the micro controller 10 before the sensed ambient temperature value is determined by the system. One or a plurality of temperature probes may be employed to provide temperature input to the micro controller 10. The plurality of temperature probes may be remotely located from the unit housing of the system. This arrangement allows for better and more accurate control of the various ambient control devices of the room such as ventilators or inside air ducts in which the return air temperature therein may be directly sensed inside the device if desired.

An outside temperature sensor 30 may be connected to the system to enable exact control of the heat damper and/or air conditioning of the room as well as control of the amount of storage on thermal storage units. For example, according to the above, on ambient temperature rise, the modulator of the damper would normally try to open the damper to maintain the temperature of the room. With the outside temperature sensor 30 in place the system may determine actually if the opening or closing of the damper can maintain the desired ambient temperature, or if the outside temperature is above the desired pre-set temperature such that it would be futile to open the damper. Accordingly, the damper would be maintained closed or in minimum position while the air conditioning is started immediately. Similarly, the outside temperature of the building might be 19 C. while the ambient temperature might be 21 C., and as soon as 30 persons come inside the room, the temperature might rise to 24 C. Instead of starting the air conditioning, the system can react to the situation in a better way by modulating the damper only.

A plurality of dip switches 31 and 32 are provided for selecting various pre-set conditions stored in the memory of the micro controller 10 of the system. Such dip switches selection eliminates the necessity for the user to select and vary the conditions through front panel push buttons or similar devices. Studies have been found that users usually do not know how thermostat programming functions and erroneous selections often result in inefficient operation of the energy management system. The following functions of the micro controller 10 may be selected with the several banks of dip switches 31 and 32 provided, as an example:

(A) Ambient Temperature Heat: the "occupied" temperature setting may be selected from 17 to 24 degrees C.(63 to 76 degrees F.) for heating.

(B) Ambient Temperature Cool: is always automatically adjusted to 3 C. above the heat set point.

(C) Set Back Temperature: may be selected to turn off the system at 2, 5, 7, 10, 13, 15, or 17 degrees C.(35, 40, 45, 50, 55, 60, or 64 degrees F.).

(D) Start Time: to select the time at which the desired ambient comfort temperature of the room should be reached. This could be set in increments of one hour intervals between 06:00 to 09:00 daily.

(E) Stop Time: to select the time at which the system would reverse to temperature set back if the room is not occupied. If the room is occupied then the system would wait for the room to become unoccupied before reversing to the set back. This temperature could be set in increments of one half hour between 15:00 to 17:00 daily.

(F) Ten Minute Door Open: this dip switch enables a function which allows the system to turn the HVAC off if the doors and/or windows have been left open for more than ten minutes.

(G) Door Close: 10/50 minute dip switches instruct the system to use for example either a 10 minute or a 50 minute time delay when the door is closed. The 10 minutes is commonly used. The 50 minute is usually used when the door contact in not installed, in that particular case the "motion" input of the system is jumpered to ground while the motion is wired directly to the door input. Therefore every time the motion detector is triggered, a 50 minutes time delay is reset, to provide enough time to detect the occupancy of the room and to maintain the lights and the HVAC on.

(H) Motion By: the system has the capability of knowing if somebody enters the room (via the door contact); if the door has not been opened by either 09:30 or 10:30 daily the system reverses automatically to the temperature set back. If this situation occurs two days in a row the system would determine that it is a vacation time which has not been pre-programmed and the system would not start the third day. This cycle is automatically reset the following week-end or if somebody opens the door.

(I) Daylight Savings: this dip switch allows the system to automatically adjust for daylight savings or to ignore any change in time.

(J) Test Fast Speed: this dip switch instructs the system to operate in normal speed, or to switch the 10 or 50 minute door closed timer and the one hour heat timer in a speed 60 times faster than normal. This feature is particularly useful for installers who can check the operation of the full system, including occupied or unoccupied condition within minutes following installation.

(K) PWM/0→10V: this dip switch instructs the system to output either a pulse width modulation or 0 to 10V according to the requirement of the heater connected on the system output. The 0 to 10V output is also used in conjunction with a relay board to generate from 1 to 4 stages of heat. The pulse width modulation (PWM) mode would for example turn the heat on for 6 seconds and turn it off for 14 seconds. This mode as well as the 0 to 10V mode allow for an extremely precise control of the temperature, always modulating and adjusting in real time.

(L) Warm Up Multiplier: the dip switch selects the warm up multiplier. For example, the warm up period may be multiplied to 1, 1.5, 2, or 3 times the normal period. The various warm up period selections also compensate for the heat retaining efficiency of a room which has very poor insulation or leaking doors or windows.

(M) 20 min/1 hour Time Delay: this dip switch is equipped in a system having a water management function so as to permit selection between a 20 min. or 1 hour time delay to fill up the water tanks of the water management system.

(N) A/C: this dip switch informs the system if the room is fitted with an air conditioning device. On most installations this does not change anything but some heat sources are equipped with an outside air damper as well as an air conditioning device. Therefore, when the temperature rises, the system first modulates the damper opening condition according to the temperature differential between the desired temperature point and the selected ambient temperature. This is also referred to as Free Cooling. If the temperature continues to rise with such damper control only if the room is also equipped with an air conditioning device, then the system would close the damper to a minimum position and turn on the air conditioning device. If there is no air conditioning device, the damper will be maintained at its maximum opened condition.

(O) Correction: these dip switches are used to easily correct any error in the readings of the temperature sensor, temperature adjustment can also be made via programming.

(P) Override: these dip switches can be actuated to adjust the normally selected ambient temperature by plus or minus 1 or 2 degrees C. These dip switches can be bypassed by providing an override external switch which can be operated for the same function by the user.

The micro controller 10 is also preprogrammed for all weekends, holidays and statutory holidays forever except for Easter which is only pre-programmed for the next 20 years (i.e. heating will not be turned on weekends, during Easter vacation etc. Date and time run continuously and are protected by a ten year battery back-up.

Additional banks of dip switches 33 and 34 may be provided to input other control information to the micro controller 10.

In order to check the memory status, or to add extra programming, the micro controller 10 emulates any type of programming device 35 such as a hand-held programmer, laptop computer or other systems which can communicate with that format on the logic level with an RS232 circuit which converts this logic level voltage into a standard RS232 voltage level. The output of this circuit may be supplied through an RJ11 (phone jack type) plug 36 which is directly mounted on the main board of the micro controller 10. Additional programming for vacation days, special days off may be easily achieved with such programming devices. The micro controller 10 is also pre-set so that the extra programming may be automatically erased after a particular predetermined date.

The micro controller 10 is operated with an external clock 10T which may be composed of a crystal and two capacitors, while the system is provided with an operating clock 37 with a 10-year back up battery, so that the Date and Time always run continuously, even when the system is not connected to a power supply source. Leap years are automatically accounted for. A dip switch is provided to allow the daylight savings hour change to take place automatically or to be bypassed.

The watchdog timer 22 may be built in one of two ways. A signal is either directly taken on the output of the micro controller 10 or on the output of the interface circuitry 38. In both cases it is then fed via a capacitor to a NAND gate. The capacitor ensures that if the micro controller 10 locks up either in "0" or "1" position a reset will happen, while the NAND gate is used to shape the signal to a logic level square wave signal. The output of this NAND gate goes via diode to an oscillator composed of another NAND gate, a capacitor and a resistor. The resistor charges the capacitor, a negative pulse coming from the previous NAND gate (via the diode) is supposed to discharge the capacitor. If the pulse is missing, the output of the second NAND gate goes to a low logic level which originates a reset on the reset circuit. The input of this reset circuit receives another signal from the reset push button. Both signals are selected at the entrance of the reset circuit.

The heat output of the room being controlled is maintained by an interface heat circuitry 39 which operates to provide the following functions:

(1) Direct heat output, one stage: a heat output is provided at a 5V logic level. This signal is then amplified and used to control a relay together with an LED. The contacts of this relay go to the connector for direct interface with a relay part of the heating system.

(2) Direct heat output, two stages: same as (1) except that two outputs and two stages are provided.

(3) Pulse width modulation: The PWM is typically used with types of heaters which incorporate a solid state type of relay or other devices which turn on and off a great number of times without affecting their longevity.

(4) The 0 to 10V output is used either directly with 0 to 10V control heaters, or can be interfaced to give 4 to 20 mA, or other types of analog signals, to control different types of heaters, or it is used to drive a comparator which can generate several stages of heat: i.e. 0V to 2.5V=stage 1, 2.5V to 5V=stage 2, 5V to 7.5V=stage 3, 7.5V to 10V=stage 4.

In the case of the PWM output, the micro controller 10 generates a 5V level when the heat source must be turned on and a 0V level when it should be turned off. This 5V is then amplified to have a more powerful output with a higher voltage. Any type of linearization can be chosen, for example, a period of 20 seconds with a differential of 2 degrees C. in temperature linearly. If for example the set temperature is 20 C.: if the ambient temperature is 18 below, the heat will be on all the time; if it is 18.1 C., the heat will be on for 19 seconds and off for 1 second; if it is 19.5 C., the heat will be on for 5 seconds and off for 15 seconds and so on. This modulation allows for an extremely precise temperature control.

(5) 0 to 10V: in the 0 to 10V mode, the micro controller outputs a 0 to 1 KHz frequency proportional to a certain difference between the ambient temperature and the required temperature. Any type of linearization can be chosen, for example, a 2 degrees C. bandwidth linearly for a 0 to 1 KHz change. Therefore, when the temperature difference is 2 C. or more the micro controller output is 1 KHz, when the difference is 0 or more the frequency is 0 Hz and the relation is linear between the two extremes. This frequency is sent to a voltage to frequency converter 40, any value could be chosen for example, 0V at 0 Hz and 5V at 1 KHz (linear in between). This 0 to 5V is then amplified by two to give a 0 to 10V output, this signal goes into a follower such as an operational amplifier, to boost it and is passed on to the heat/damper switching circuitry 30 to initiate the heating operation. If, for example, the set temperature is 20 C.; if the ambient temperature is 18 or below, the output voltage will be 10V; if it is 18.1 C., the output voltage will be 9.5V; and if it is 19.6 C., the output voltage will be 2V. This linearization allows for an extremely precise temperature control.

The micro controller 10 also outputs to the damper through the frequency to voltage converter 40 and heat/damper switching circuitry 41 and a damper interface circuitry 42. The damper output functions in one of two ways: either 0 to 10V or dry contact. An output is provided by the micro controller 10 at a 5V logic level for the dry contact circuitry. The signal is then amplified and used to control a relay together with an indicating LED. The contacts of this relay go directly to the PCB connector for direct interface with an outside device.

The 0 to 10V output operates in a similar manner to the heat circuit in that a 0 to 1 KHz output provides a 0 to 10V output. However, as soon as the room is occupied the damper output produces a voltage to adjust the damper to a minimum position. When the ambient temperature increases, the voltage produced by the frequency to voltage converter is added to this minimum opening voltage to modulate the damper. This modulation serves the purpose of free cooling for allowing in more or less outside air according to the difference in temperature between the set point and the ambient temperature. If air conditioning is available, the damper will modulate fully open before turning on the air conditioning, and if the temperature continues to rise then the damper output would go to minimum position while the air conditioning starts.

The micro controller 10 controls analog switches to redirect the 0 to 10V output to either the heat circuit when in the heat mode, or to the damper when it is not in the heat mode. A status display such as an LED is provided to show the mode in which the system is functioning.

The micro controller 10 controls the air conditioning 43 through an air conditioning interface 44 which operates in either a single stage, if no damper is available, to turn on the air conditioning device at the pre-set temperature, or in two stages if a damper is available with free cooling as the first stage of cooling in which the opening of the damper is adjusted to maintain the ambient temperature to the pre-set temperature. An LED may be incorporated in the air conditioning interface 44, which will be lighted to indicate the system is functioning in the air conditioning mode.

The micro controller 10 sends an output signal to turn on or off the lighting equipment in the room through a light control interface 45 according to the occupancy of the room. An LED is incorporated in the light control interface 45, which will be lighted to indicate that the lighting control mode is on. For maximum energy savings, the lighting does not follow the heating pattern. It turns on when the door is opened, it then stays on for as long as the room is occupied or the door is open. If the room is unoccupied, the lighting turns off after the 10 or 50 minute time delay as instructed by the dip switches. This enables all the lighting to be turned off even during a break or lunch hour when the room is empty.

The micro controller 10 provides an output signal through the fan control interface 46 to operate a ventilation fan according to the occupancy of the room and heat requirement. An LED is incorporated in the fan control interface 46, which will be lighted to indicate the fan control mode is on.

The micro controller 10 may also provide output signals to various other loads such as a wall-mounted air conditioning device, through an occupancy interface 47. A LED in this interface will be lighted to indicate its operation.

Thermal storage heaters may be operated by the micro controller 10 through a storage interface 48 which also has an LED to indicate its operation.

When used in conjunction with water energy management, a solenoid valve interface 49 will receive the output signal from the micro controller 10 to control the operation of the water supply according to pre-set conditions. It turns on during working days according to the start time and stays on until either room, typically a washroom, is not occupied or until stop time. It also comes on and stays on for the time delay duration after hours or on non-working days. Every day at midnight this output is activated for the duration of the time delay to fill the J-trap of the water system so as to compensate for evaporation and to prevent hazardous gas from entering the building.

Windows can also be wired to the system, and the heating/cooling of the room is stopped after 10 minutes of the window or windows being left open, as in some buildings the door might be left open for long periods. This feature can also be enabled or disabled with a dip switch provided.

Wiring windows to the system not only enables a closer HVAC control if the windows are left open but also serves other purposes such as turning the lights on if a burglar tries to enter the room. An alarm contact output can also be interconnected with existing alarm system.

While the preferred embodiments of the invention have been described above, it will be recognized and understood that various modifications may be made therein and the appended claims are intended to cover all such modifications which may fall within the spirit and scope of the invention.

What I claim is:

1. An energy saving control apparatus for a heating, venting and air conditioning equipment in a building having a plurality of rooms in which each room has at least one entrance door, comprising:

a micro controller means having a plurality of mechanical memory means with stored algorithms adapted to provide a plurality of predetermined programs for operating said heating, venting and air conditioning equipment, a plurality of mechanically operated dip switches coupled to said micro controller means and adapted for selecting said plurality of predetermined programs for providing desired ambient temperature conditions for said room, including time of day when said selected ambient temperature conditions are to be provided, interface circuit means connected to said micro controller means and operative to generate a plurality of output signals to said micro controller means according to said plurality of predetermined programs selected, a door contact mounted at said at least one entrance door and connected to said interface circuit means, a motion sensor located in said room and connected also to said interface circuit means, said door contact and said motion sensor, in combination, adapted to actuate said interface circuit means to control said micro controller means for operating said heating, venting and air conditioning equipment in response to occupancy conditions of said room.

2. An apparatus according to claim 1 including a temperature sensor connected to said micro controller means, and a clock means adapted to operate said micro controller means to determine in real time, actual temperature condition in said room for varying said predetermined programs according to said occupancy conditions in said room.

3. An apparatus according to claim 2 wherein said predetermined programs include a fast speed program adapted to operate said predetermined programs selected in an accelerated speed for testing the general operation of said apparatus and said equipment.

4. An apparatus according to claim 2 wherein said room has at least two entrance doors with a door contact mounted at each one of said doors and connected to said interface circuit means, and said micro controller means in response to operation of said door contact mounted at each one of said doors and in combination with the operation of said motion sensor for determining an accurate occupancy condition of said room so as to operate said heating, venting and air conditioning equipment efficiently according to said accurate occupancy condition.

5. A method of maximizing energy saving in providing heating, venting and air conditioning operations in a room within a building having a plurality of rooms, by heating, venting and air conditioning equipment, comprising:

storing a plurality of predetermined operating programs in a micro controller means, said micro controller means being addressable by a plurality of mechanically operated switch means to operate selected ones of said predetermined operating programs, actuating selected ones of said plurality of mechanically operated switch means to execute selected ones of said predetermined operating programs including selecting a desired ambient temperature condition in a selected time period for said room, monitoring real time temperature condition of said room with a temperature sensing means and inputting said real time temperature condition to said micro controller means, detecting accurate occupancy conditions of said room by mounting a door contact at a door of said room, and also mounting a motion sensor in said room, said door contact and said motion sensor cooperatively addressing said micro controller means to determine accurately said occupancy conditions for operating said equipment to obtain said desired ambient temperature condition for said room according to said predetermined operating programs and said occupancy conditions.

6. A method of maximizing energy saving according to claim 5 including providing a temperature probe means outside of said building for inputting ambient outside temperature from outside of said building to said micro controller means for determining the amount of energy stored in said equipment and for determining selectively, to remain in a heating mode, to modulate an outside air damper to said room, or to actuate an air conditioning device in said equipment for obtaining said desired ambient temperature condition in said room.

7. A method according to claim 5 wherein said micro controller means is settable to operate selectively in a pulse width modulation mode and a 0 to 10 volt mode, and in said pulse width modulation mode said micro controller means generating a 5 volt level when a heat source of said heating, venting and air conditioning equipment is turned on, and a 0 volt level when the heat source of said heating, venting and air conditioning equipment is turned off, and in said 0 to 10 volt mode said micro controller means generating a differential signal proportional to predetermined differences between actual temperature condition in said room and said desired ambient temperature condition.

8. A method according to claim 5 wherein said selected predetermined programs include a program for turning said equipment in a series of on and off cycles prior to a pre-set time at which said room is to be at said desired ambient temperature condition so as to attain said desired ambient temperature condition at said pre-set time accurately.

9. A method according to claim 8 including operating said equipment in a selective time period chosen from 1, 1.5, 2 and 3 time operating periods.

10. A method according to claim 8 wherein said predetermined programs include a program for turning said equipment off when said door contact is opened for a predetermined time period and when said motion sensor has detected motion in said room.

11. A method according to claim 10 wherein said equipment is turned off when said door contact is opened for more than 10 minutes.

12. A method according to claim 8 including pre-heating said room at 50% capacity prior to said pre-set time and adjusting a heating rate of said room in real time so as to attain said desired ambient temperature condition of said room at said pre-set time.

13. A method according to claim 5 wherein said micro controller means includes a program selectively actuated for operating selected predetermined programs at an accelerated speed for testing overall operation of said equipment and said selected predetermined programs.

14. A method according to claim 5 including providing a temperature probe means outside of said building for informing outside temperature condition to said micro controller means for modulating a damper coupled to said room to draw outside air selectively into said room in cooperation with the operation of said heating venting and air conditioning equipment so as to attain said desired ambient temperature condition for said room.

15. A method according to claim 14 wherein said outside air is drawn selectively into said room by a blower fan operating at a constant speed.

16. A method according to claim 5 wherein said micro controller means includes a program adapted for selectively turning on and off lighting equipment provided in said room according to said occupancy conditions.

* * * * *